(12) United States Patent
Kinoshita et al.

(10) Patent No.: US 12,717,348 B2
(45) Date of Patent: Aug. 25, 2026

(54) INFORMATION PROCESSING DEVICE AND INFORMATION PROCESSING METHOD

(71) Applicant: SONY GROUP CORPORATION, Tokyo (JP)

(72) Inventors: Masaya Kinoshita, Tokyo (JP); Kenichiro Nagasaka, Tokyo (JP); Noriaki Takasugi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/546,281

(22) PCT Filed: Feb. 10, 2022

(86) PCT No.: PCT/JP2022/005232

§ 371 (c)(1),
(2) Date: Aug. 14, 2023

(87) PCT Pub. No.: WO2022/176751

PCT Pub. Date: Aug. 25, 2022

(65) Prior Publication Data

US 2024/0126303 A1 Apr. 18, 2024

(30) Foreign Application Priority Data

Feb. 22, 2021 (JP) ................................ 2021-026428

(51) Int. Cl.
*G05D 1/654* (2024.01)
*G05D 1/49* (2024.01)
*G05D 109/12* (2024.01)

(52) U.S. Cl.
CPC ............... *G05D 1/654* (2024.01); *G05D 1/49* (2024.01); *G05D 2109/12* (2024.01)

(58) Field of Classification Search
CPC ...... G05D 1/654; G05D 1/49; G05D 2109/12; B62D 57/032; B25J 13/089; B25J 9/1653
(Continued)

(56) References Cited

U.S. PATENT DOCUMENTS 5,459,659 A * 10/1995 Takenaka ............. B62D 57/032
9,387,588 B1 * 7/2016 Blankespoor .......... B25J 9/1692
(Continued)

FOREIGN PATENT DOCUMENTS

EP 4112234 A1 1/2023
JP 05-277968 A 10/1993
(Continued)

OTHER PUBLICATIONS

International Search Report and Written Opinion of PCT Application No. PCT/JP2022/005232, issued on Apr. 12, 2022, 08 pages of ISRWO.

*Primary Examiner* — Ellis B. Ramirez
(74) *Attorney, Agent, or Firm* — CHIP LAW GROUP

(57) ABSTRACT

Provided is an information processing device that includes a calculation unit that calculates an amount of change in a landing point of a landing point position to which a current swing leg of a robotic apparatus including one or more legs to land next from a planned landing point position, and an amount of change in the center of pressure of a position of the center of pressure to be generated by a current ground contact leg of the robotic apparatus from a position of a target center of pressure, and a drive control unit that controls an attitude and movement of the robotic apparatus, based on at least one of the amount of change in the landing point or the amount of change in the center of pressure, calculated by the calculation unit.

9 Claims, 14 Drawing Sheets

(58) Field of Classification Search
USPC ...... 700/245, 259, 261, 263; 382/153; 901/1
See application file for complete search history.

(56) References Cited

U.S. PATENT DOCUMENTS

| | | | | |
|---|---|---|---|---|
| 2005/0021176 | A1* | 1/2005 | Takenaka | B62D 57/032 |
| 2005/0240306 | A1* | 10/2005 | Takenaka | B62D 57/032 |
| 2006/0106495 | A1* | 5/2006 | Takenaka | B62D 57/032 |
| 2015/0231786 | A1* | 8/2015 | Doi | B25J 9/1605 |
| 2017/0165836 | A1* | 6/2017 | Kanazawa | G05D 1/021 |
| 2019/0070729 | A1* | 3/2019 | Kamioka | B62D 57/032 |
| 2020/0117198 | A1* | 4/2020 | Whitman | G05D 1/0248 |
| 2021/0323149 | A1* | 10/2021 | Graber-Tilton | B25J 9/1653 |
| 2023/0018155 | A1* | 1/2023 | Takasugi | B62D 57/032 |

FOREIGN PATENT DOCUMENTS

| | | | | |
|---|---|---|---|---|
| JP | 2011-240475 A | | 12/2011 | |
| JP | 2014151370 A | * | 8/2014 | |
| JP | 2017-202535 A | | 11/2017 | |
| JP | 2021102233 A | * | 7/2021 | B25J 13/00 |
| WO | 2019/187506 A1 | | 10/2019 | |

* cited by examiner $x_0$
$x_3$
$p_0$
$p_1$
$p_2$
$p_3$
$dx_0$
$dx_1$
$dx_2$
$dx_3$
$l_0$
$l_1$
$l_2$
$dl_1$
$dl_2$
$dl_3$

ASSUMING CONSTANT HEIGHT, FOLLOWING DYNAMICS ARE OBTAINED (LINEAR INVERTED PENDULUM)

$$\omega = \sqrt{\frac{g}{h}} \quad (\omega > 0)$$

$$X_N(t) = \underbrace{\frac{1}{2\omega}(\omega X_N(0) + \dot{X}_N(0))e^{\omega t}}_{\text{DCM}} + \underbrace{\frac{1}{2\omega}(\omega X_N(0) - \dot{X}_N(0))e^{-\omega t}}_{\text{CCM}} \quad \text{FORMULA (a)}$$

DCM (Divergent component of motion) CCM (Convergent component of motion)

OBTAIN CoP OPERATION AMOUNT AND AMOUNT OF CHANGE IN STEP LENGTH SO AS TO INVALIDATE DCM COMPONENT AND SATISFY FOLLOWING CONSTRAINT.

$$\omega X_N(0) + \dot{X}_N(0) = 0 \quad \text{FORMULA (b)}$$

$$\begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} dx_0 \\ dx_1 \\ dx_2 \\ dl_0 \\ dl_1 \\ dl_2 \end{bmatrix} = \begin{bmatrix} 0 \\ 0 \\ 0 \\ dl_0 \\ dl_1 \\ dl_2 \end{bmatrix}$$

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/005232 filed on Feb. 10, 2022, which claims priority benefit of Japanese Patent Application No. JP 2021-026428 filed in the Japan Patent Office on Feb. 22, 2021. Each of the above-referenced applications is hereby incorporated herein by reference in its entirety.

FIELD

The present disclosure relates to an information processing device, an information processing method, and a program.

BACKGROUND

In recent years, legged robotic apparatuses (robotic apparatuses with legs) have been developed as mobile robots. The legged robotic apparatuses can freely move even in an environment including steps and stairs that are difficult for wheeled robotic apparatuses to move on, and in an environment such as uneven ground. Therefore, the legged robotic apparatuses are expected as mobile bodies capable of performing transportation of loads on mountain roads or the like, instead of humans.

Various technologies have been studied as technologies for stabilizing the attitude and walking of such legged robotic apparatuses. For example, Patent Literature 1 described below discloses a technology to stabilize the attitude and walking of a biped robot by controlling a stance leg or a swing leg so as to return the upper body of the biped robot rotated due to disturbance. In addition, Patent Literature 2 described below discloses a technology to stabilize the attitude and walking of a biped robot by switching processing of operation upon disturbance, between parallel control to perform both a control task (low frequency) for stabilizing disturbance and a planned task.

CITATION LIST

Patent Literature

Patent Literature 1: JP 2017-202535 A
Patent Literature 1: JP 2011-240475 A

SUMMARY

Technical Problem

However, in the conventional art described above, it is not always possible to improve stabilization performance of the legged robotic apparatuses against unknown disturbances. For example, in the conventional technology described in Patent Literature 1 described above, only the stance leg or swing leg is controlled to return the upper body of the biped robot rotated due to disturbance to the original position, without consideration for the balance of the center of gravity of the entire robot. Therefore, in some cases, it is not said that the resistance to disturbance is so high. In addition, in the conventional technology described in Patent Literature 2, only switching the processing of operation upon disturbance, between the parallel control to perform both the control task (low frequency) for stabilizing disturbance and the planned task, causing a delay before switching the control. Therefore, in some cases, immediate response to the disturbance is prevented.

Therefore, the present disclosure proposes an information processing device, an information processing method, and a program that are configured to improve stabilization performance of a legged robotic apparatus against unknown disturbances.

Solution to Problem

According to the present disclosure, an information processing device is provided that includes: a calculation unit that calculates an amount of change in a landing point of a landing point position to which a current swing leg of a robotic apparatus including one or more legs to land next from a planned landing point position, and an amount of change in the center of pressure of a position of the center of pressure to be generated by a current ground contact leg of the robotic apparatus from a position of a target center of pressure; and a drive control unit that controls an attitude and movement of the robotic apparatus, based on at least one of the amount of change in the landing point or the amount of change in the center of pressure, calculated by the calculation unit.

Moreover, according to the present disclosure, an information processing method is provided that includes: an arithmetic processing device, calculating an amount of change in a landing point of a landing point position to which a current swing leg of a robotic apparatus including one or more legs to land next from a planned landing point position, or an amount of change in the center of pressure of a position of the center of pressure to be generated by a current ground contact leg of the robotic apparatus from a position of a target center of pressure; and controlling an attitude and movement of the robotic apparatus, based on at least one of the amount of change in the landing point or the amount of change in the center of pressure, calculated.

Moreover, according to the present disclosure, a program is provided that causes a computer to function as: a calculation unit that calculates an amount of change in a landing point of a landing point position to which a current swing leg of a robotic apparatus including one or more legs to land next from a planned landing point position, or an amount of change in the center of pressure of a position of the center of pressure to be generated by a current ground contact leg of the robotic apparatus from a position of a target center of pressure; and a drive control unit that controls an attitude and movement of the robotic apparatus, based on at least one of the amount of change in the landing point or the amount of change in the center of pressure, calculated by the calculation unit.

According to the present disclosure, the position of the center of pressure to be generated by the current ground contact leg of the robotic apparatus including one or more legs should be generated and the landing point position to which the current swing leg to land next can be calculated at the same time with a calculation amount that can be performed in real-time, and therefore, the stabilization performance of the legged robotic apparatus against unknown disturbances can be improved.

BRIEF DESCRIPTION OF DRAWINGS

FIG. 10 is a diagram illustrating an equation of motion of the center of gravity after t seconds from landing of the Nth step according to the embodiment.

DESCRIPTION OF EMBODIMENTS

Figure 1:
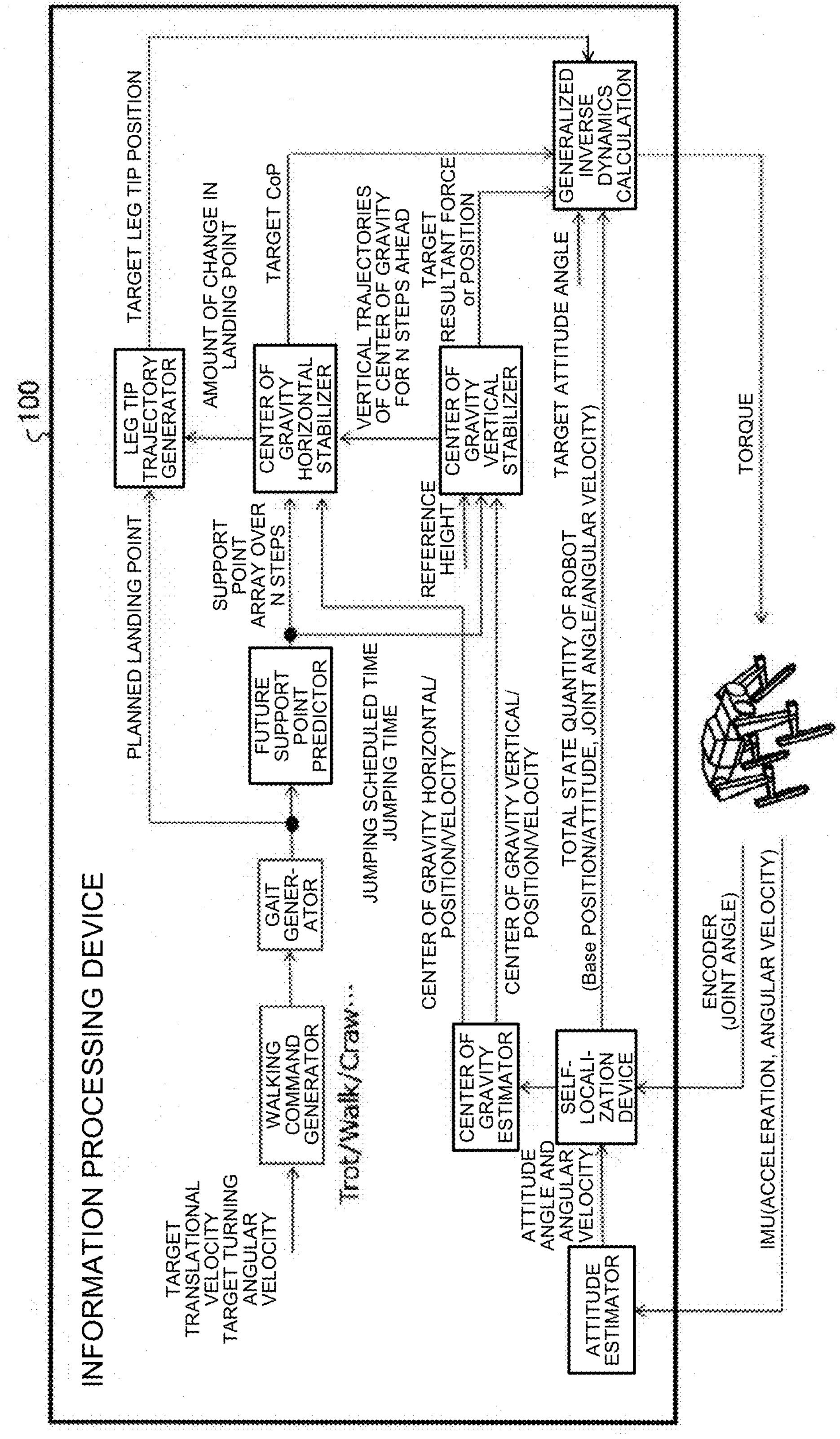
FIG. 1 is a diagram illustrating an overview of control processing in a robotic apparatus, by an information processing device according to an embodiment of the present disclosure.

Embodiments of the present disclosure will be described in detail below with reference to the drawings. Note that in the following embodiments, the same portions are denoted by the same reference numerals and symbols, and repetitive description thereof will be omitted.

Embodiments

1. Overview

First, an overview of control processing in a robotic apparatus 1, by an information processing device 100 according to an embodiment of the present disclosure will be described with reference to FIG. 1. FIG. 1 is a diagram illustrating the overview of the control processing in the robotic apparatus 1, by the information processing device 100 according to the embodiment of the present disclosure. In the present embodiment, the robotic apparatus 1 that is a legged robotic apparatus 1 including four legs as illustrated in FIG. 1 will be described. Among the blocks illustrated in FIG. 1, a center of gravity horizontal stabilizer is a block according to the present invention.

The information processing device 100 includes a walking command generator. The walking command generator generates a walking command for the robotic apparatus 1 on the basis of a target translational velocity and a target turning angular velocity of the robotic apparatus 1, and an instruction on walking (gait) of the robotic apparatus 1 that are received from a user. Note that the walking command will be described in detail later with reference to FIG. 5.

Figure 2:
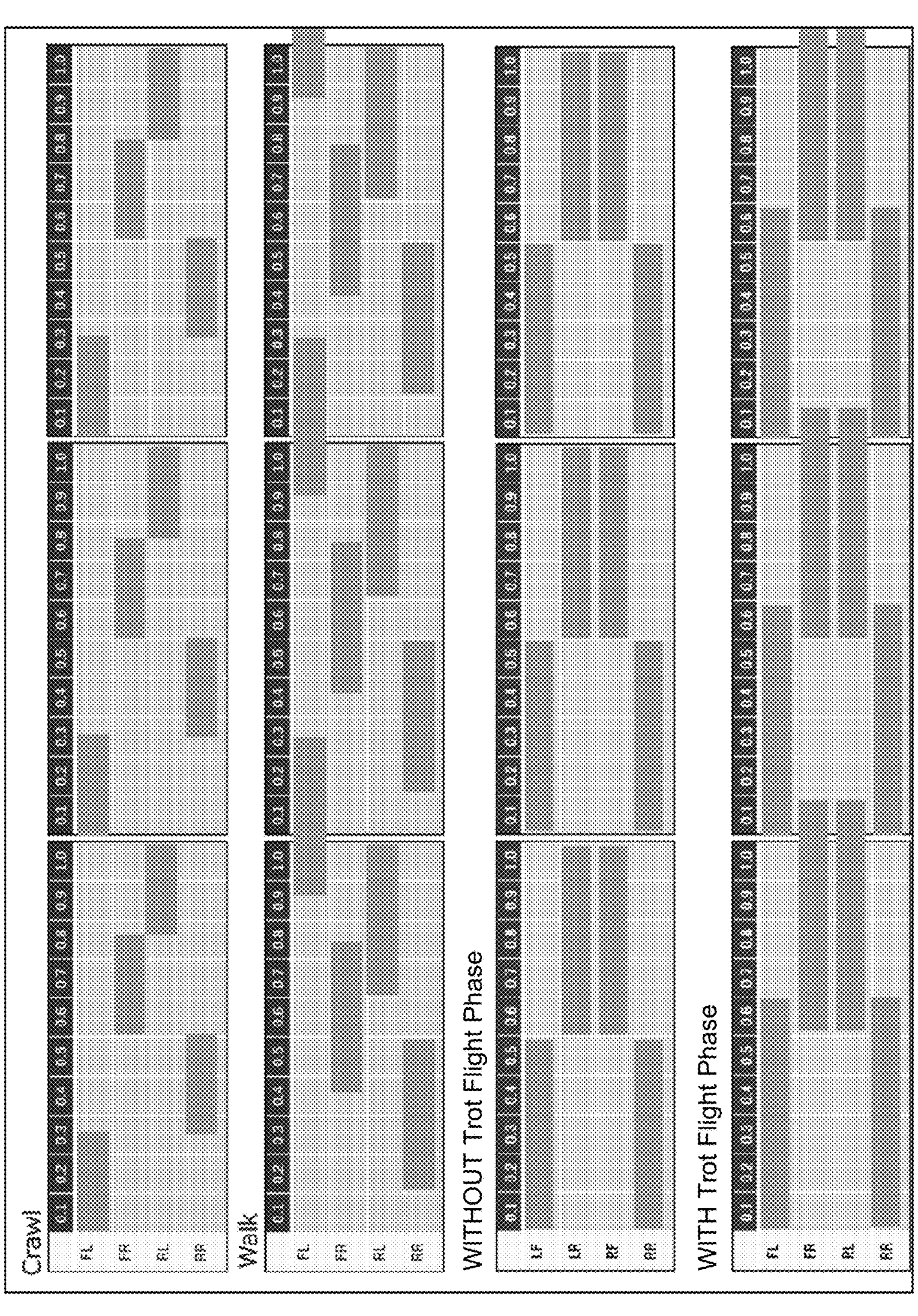
FIG. 2 is a diagram illustrating an exemplary generation of a gait of the robotic apparatus according to the embodiment.

Furthermore, the information processing device 100 includes a gait generator. The gait generator generates a chart (hereinafter, also referred to as gait chart) indicating a walking pattern of the robotic apparatus 1 as illustrated in FIG. 2 described later, on the basis of the walking command generated by the walking command generator.

In addition, the gait generator generates the gait chart and generates landing point coordinates indicating a planned landing point position of a landing point position to which a current swing leg of the robotic apparatus 1 to land next.

Furthermore, the information processing device 100 includes a future support point predictor. The future support point predictor generates, from the gait chart generated by the gait generator, an array of support point coordinates (hereinafter, also referred to as support point array) indicating planned support point positions (hereinafter, also referred to as planned support point positions for N steps ahead) obtained by averaging ground contact point coordinates indicating planned ground contact point positions of ground contact legs of the robotic apparatus 1 over N steps (N is a natural number).

Furthermore, the information processing device 100 includes an attitude estimator. The attitude estimator estimates an attitude angle and an attitude angular velocity of the robotic apparatus 1 on the basis of acceleration and an angular velocity of the robotic apparatus 1 detected by an inertial measurement unit (IMU) mounted on the robotic apparatus 1.

Furthermore, the information processing device 100 includes a self-localization device. The self-localization device estimates a basic position and a basic attitude, a basic joint angle and a basic joint angular velocity of the robotic apparatus 1, on the basis of a motor angle of a joint of the robotic apparatus 1 detected by an encoder mounted on the joint of the robotic apparatus 1 and the attitude angle and the attitude angular velocity of the robotic apparatus 1 estimated by the attitude estimator.

Furthermore, the information processing device 100 includes a center of gravity estimator. The center of gravity estimator calculates a reaction force that each of the legs receives from a ground contact surface, on the basis of a torque applied to each joint of the leg of the robotic apparatus 1. The center of gravity estimator estimates a horizontal position of the current center of gravity of the robotic apparatus 1, on the basis of the magnitude of the reaction force received by each leg from the ground contact surface. In addition, the center of gravity estimator estimates a horizontal velocity of the current center of gravity of the robotic apparatus 1, on the basis of the horizontal position of the center of gravity of the robotic apparatus 1. In addition, the center of gravity estimator estimates a vertical position of the current center of gravity of the robotic apparatus 1 by performing geometric calculation by using the horizontal position of the center of gravity of the robotic apparatus 1 in a plurality of attitudes. In addition, the center of gravity estimator estimates a vertical velocity of the current center of gravity of the robotic apparatus 1, on the basis of the vertical position of the center of gravity of the robotic apparatus 1.

Furthermore, the information processing device 100 includes a center of gravity vertical stabilizer. The center of gravity vertical stabilizer calculates vertical positions (also referred to as vertical trajectories) of the center of gravity of the robotic apparatus 1 and target resultant forces or target positions, for N steps ahead, on the basis of a reference vertical position of the center of gravity of the robotic apparatus 1, the vertical position and vertical velocity of the current center of gravity of the robotic apparatus 1 estimated by the center of gravity estimator, and the support point array over N steps generated by the future support point predictor.

Furthermore, the information processing device 100 includes the center of gravity horizontal stabilizer. Inside the center of gravity horizontal stabilizer, the planned support point is treated as a target center of pressure. The center of gravity horizontal stabilizer calculates an amount of change in the landing point of the landing point position to which the current swing leg of the robotic apparatus 1 to land next from the planned landing point position, and an amount of change in the center of pressure of the position of the center of pressure to be generated by the current ground contact leg of the robotic apparatus 1 from a position of the target center of pressure, on the basis of the horizontal position and the horizontal velocity of the current center of gravity of the robotic apparatus 1, the planned support point positions (positions of the target center of pressure) of the robotic apparatus 1 for N steps ahead, and the vertical positions of the center of gravity of the robotic apparatus 1 for N steps ahead calculated by the center of gravity vertical stabilizer. Note that hereinafter, the center of pressure (CoP) may be simply referred to as CoP.

Furthermore, the information processing device 100 includes a leg tip trajectory generator. The leg tip trajectory generator calculates a target leg tip position that is the landing point position to which the current swing leg of the robotic apparatus 1 to land next, on the basis of the planned landing point position generated by the gait generator and the amount of change in the landing point calculated by the center of gravity horizontal stabilizer.

In addition, the information processing device 100 achieves the position of the center of pressure (calculated by the center of gravity horizontal stabilizer) and the target leg tip position (calculated by the leg tip trajectory generator) that stabilize the robotic apparatus 1 by using whole-body cooperative control using generalized inverse dynamics (GID) in the actual robotic apparatus 1.

Figure 3:
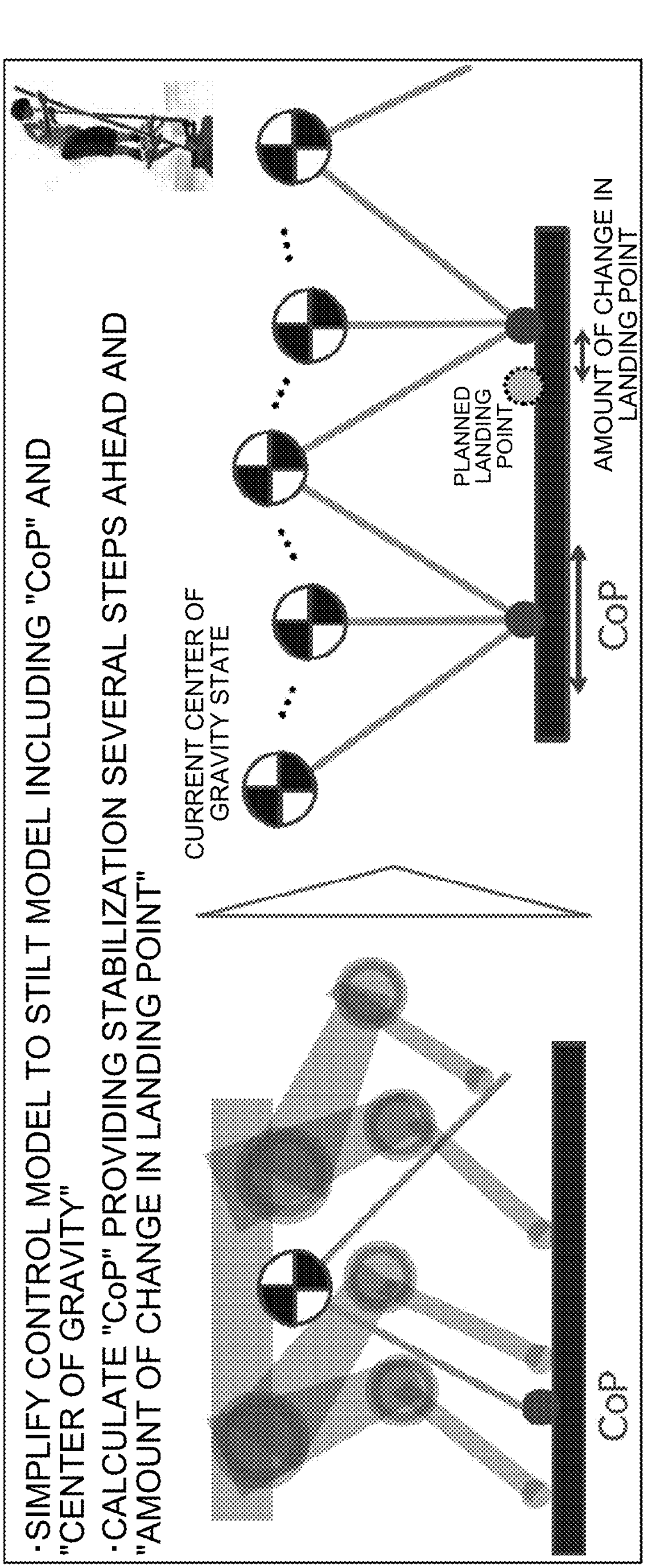
FIG. 3 is a diagram illustrating a control model for the robotic apparatus according to the embodiment.

Next, a control model for the robotic apparatus 1 according to the embodiment will be described with reference to FIG. 3. FIG. 3 is a diagram illustrating the control model for the robotic apparatus 1 according to the embodiment. As illustrated on the left side of FIG. 3, in the present embodiment, the control model for the robotic apparatus 1 including one or more legs is considered as a center of gravity-center of pressure model including the center of gravity of the robotic apparatus 1 and the center of pressure (CoP) to be generated by the ground contact leg of the robotic apparatus 1.

Considering all the complicated mechanisms of the entire robotic apparatus 1, the calculation time increases. Therefore, in the present embodiment, as illustrated on the left side of FIG. 3, the model is simplified to the center of gravity-center of pressure model such as a stilt model including the center of gravity of the robotic apparatus 1 and the center of pressure (CoP) of the robotic apparatus 1. For this center of gravity-center of pressure model, the position of the center of pressure that provides stabilization several steps ahead (e.g., N steps ahead) and the amount of change in the landing point from the planned landing point position are obtained, with the current center of gravity state as an input Here, the reason why the stabilization is provided several steps ahead is to suppress occurrence of an excessive amount of change in step length when a large disturbance such as pressing of the robotic apparatus 1 or a user command is changed. The center of gravity-center of pressure model does not depend on the number of legs and a ground contact (landing) pattern of the robotic apparatus 1, and a model having high generality is provided. In addition, the model is a simple and highly real-time model.

Furthermore, as illustrated on the right side of FIG. 3, in the present embodiment, the information processing device 100 considers the control model for the robotic apparatus 1 as the center of gravity-center of pressure model including the center of gravity and the center of pressure (CoP) of the robotic apparatus 1, and calculates an equation of motion of the center of gravity of the robotic apparatus 1 for N steps ahead with the amount of change in the landing point and the amount of change in the center of pressure as unknown parameters. The information processing device 100 controls the attitude and movement of the robotic apparatus 1 so as to achieve the landing point position based on the calculated amount of change in the landing point and the calculated center of pressure based on the amount of change in the center of pressure. Therefore, the information processing device 100 is operable to stabilize the robotic apparatus 1 so that the robotic apparatus 1 does not tumble N steps ahead (e.g., several steps ahead).

Figure 4:
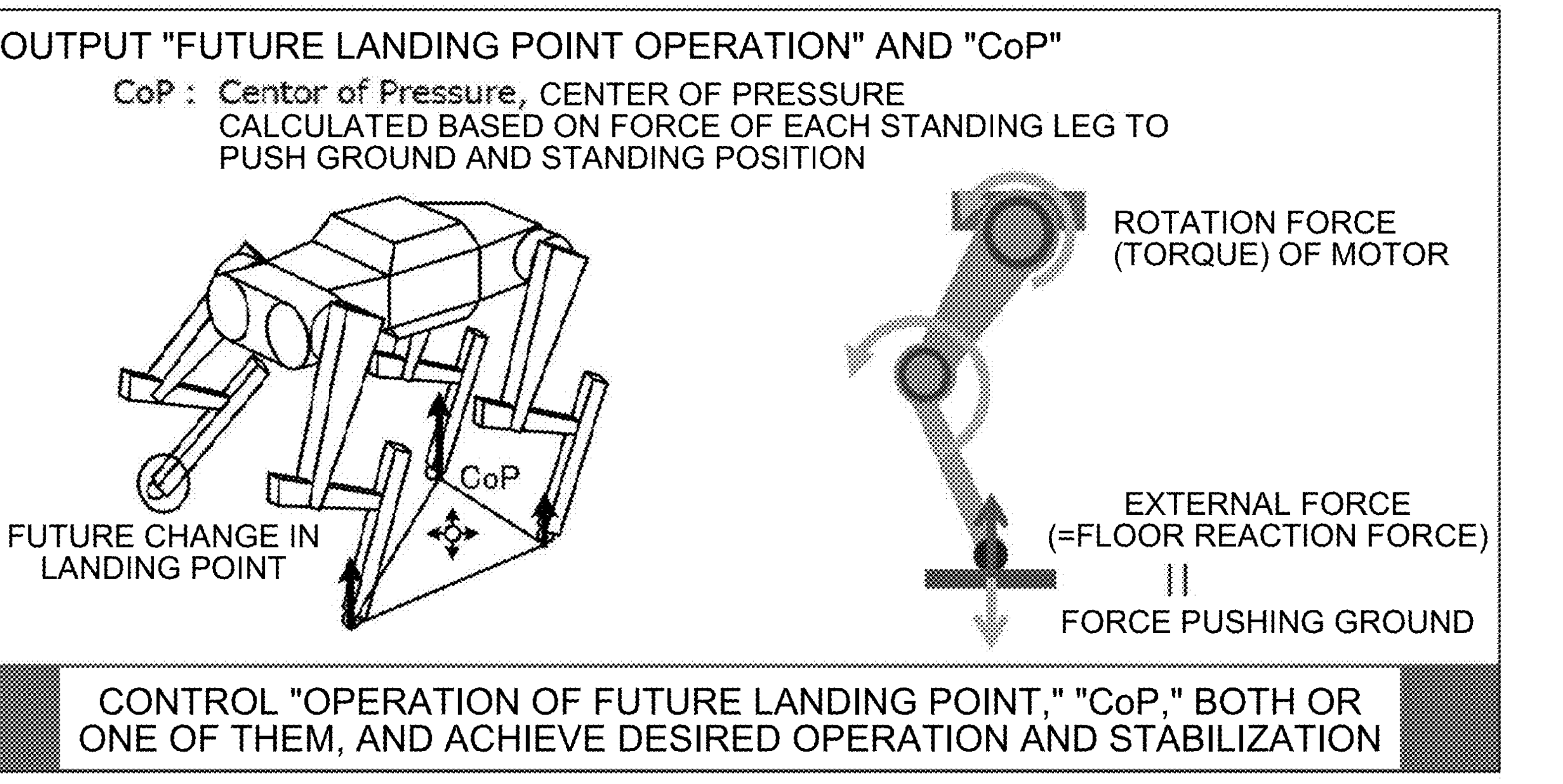
FIG. 4 is a diagram illustrating an image of output from a center of gravity horizontal stabilizer and a relationship between a floor reaction force and a joint torque, according to the embodiment.

Next, an image of output from the center of gravity horizontal stabilizer and a relationship between a floor reaction force and a joint torque, according to the embodiment will be described with reference to FIG. 4. FIG. 4 is a diagram illustrating the image of output from the center of gravity horizontal stabilizer and the relationship between the floor reaction force and the joint torque, according to the embodiment. The left side of FIG. 4 shows the image of output from the center of gravity horizontal stabilizer. As illustrated on the left side of FIG. 4, the center of gravity horizontal stabilizer calculates the amount of change in the landing point (future amount of change in the landing point) from the planned landing point position of the landing point position to which the foot tip of the swing leg of the robotic apparatus 1 lands next. The future amount of change in the landing point means a minimum amount of change in the landing point that indicates where the leg should be put from a planned trajectory of the leg to achieve desired movement of the robotic apparatus 1 for the purpose of preventing the tumbling of the robotic apparatus 1. The information processing device 100 calculates the future amount of change in the landing point per tick to change the landing point to a position where the robotic apparatus 1 does not tumble while achieving the desired operation according to the instruction from the user as much as possible.

In addition, as illustrated on the left side of FIG. 4, the center of gravity horizontal stabilizer calculates the amount of change in the center of pressure of the position of the center of pressure to be generated by the current ground contact leg of the robotic apparatus 1 from the position of the target center of pressure. Here, the center of pressure is the center of force on a polygon (also referred to as support polygon) formed by connecting the ground contact positions of the ground contact legs of the robotic apparatus 1. The center of pressure is calculated from a force of each ground contact leg of the robotic apparatus 1 to push the ground and each of the ground contact positions at which the ground contact legs of the robotic apparatus 1 make contact with the ground. The right side of FIG. 4 illustrates the relationship between the floor reaction force and the joint torque. The force of the ground contact leg of the robotic apparatus 1 to push the ground is converted to an external force and transmitted to the robotic apparatus 1 as the reaction force (the floor reaction force). Furthermore, the magnitude of the force of the ground contact leg of the robotic apparatus 1 to push the ground is determined from a torque generated by each joint of the leg of the robotic apparatus 1 and a geometric relationship in the robotic apparatus 1. In other words, the center of pressure can be controlled by controlling the torque of a motor at each joint of the leg of the robotic apparatus 1.

As described above, the information processing device 100 controls only both or one of the operation of the future landing point of the swing leg of the robotic apparatus 1 and the operation of the center of pressure to be generated by the current ground contact leg of the robotic apparatus 1, thereby simultaneously achieving desired operation by the robotic apparatus 1 and the stabilization of the robotic apparatus 1.

2. Exemplary Configuration

Figure 5:
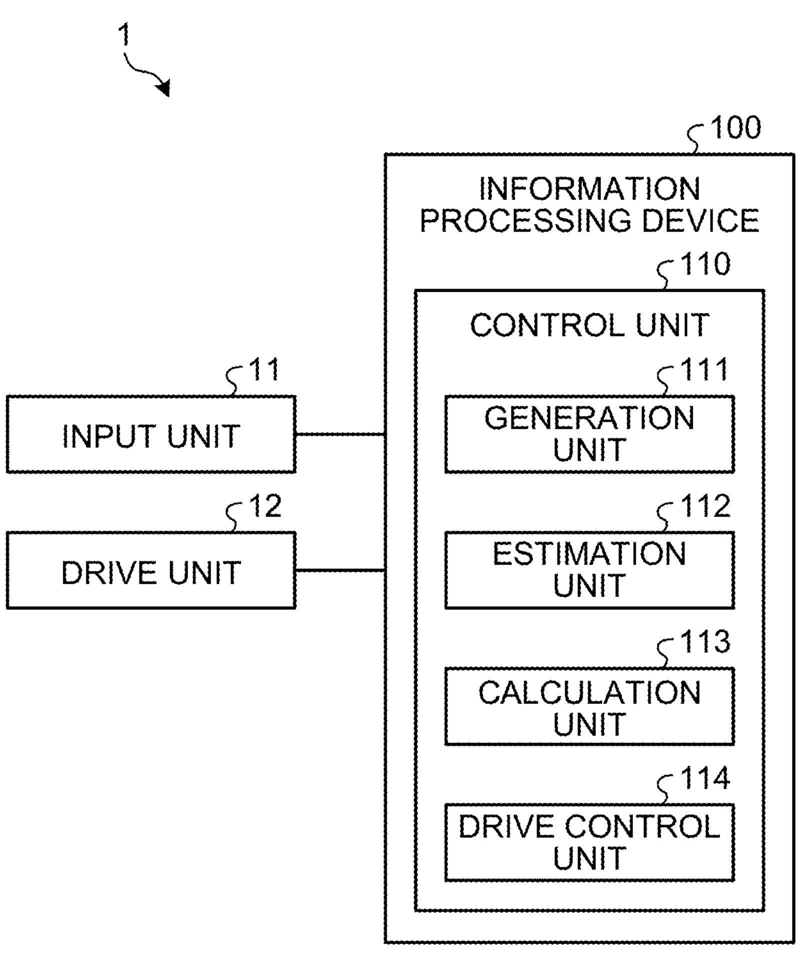
FIG. 5 is a block diagram illustrating a functional configuration of the robotic apparatus including the information processing device according to the embodiment.

Next, a functional configuration of the robotic apparatus 1 including the information processing device 100 according to the embodiment will be described with reference to FIG. 5. FIG. 5 is a block diagram illustrating the functional configuration of the robotic apparatus 1 including the information processing device according to the embodiment. Note that the information processing device 100 may be provided, for example, in a main body portion of the robotic apparatus 1.

As illustrated in FIG. 5, the robotic apparatus 1 includes an input unit 11, a drive unit 12, a torque detection unit 13, and the information processing device 100.

The input unit 11 includes an input device that enables the user to input information to the robotic apparatus 1. The input unit 11 may include, for example, an input device, such as a touch panel, button, microphone, switch, or lever, to which information is input, and an input control circuit that generates an input signal on the basis of the input information.

The drive unit 12 generates a torque to turn a joint provided in each of the legs on the basis of a control command or the like from a drive control unit 114. The drive unit 12 is, for example, an electric motor that makes a rotational motion by electric energy, and may be provided for each joint of each leg. Each of the legs is bent or stretched by turning each joint of each leg by the drive unit 12.

The torque detection unit 13 detects the magnitude of the torque applied to the joint from the drive unit 12 in each leg. The torque detection unit 13 may include a magnetostrictive, strain gauge, piezoelectric, optical, spring, or capacitive torque sensor to directly detect the torque applied to the joint. Alternatively, the torque detection unit 13 may include a voltmeter or ammeter that detects the magnitude of voltage or current applied to the drive unit 12 so as to calculate the torque applied to the joint on the basis of the magnitude of the voltage or current applied to the drive unit 12. The magnitude of the torque detected by the torque detection unit 13 is used to calculate the reaction force received by each leg from the ground contact surface, together with the length of a link constituting each leg.

The information processing device 100 includes a control unit 110. The control unit 110 is a controller, and is implemented by executing various programs (corresponding to an example of an information processing program) stored in a storage device in the information processing device 100 by using, for example, a central processing unit (CPU), a micro processing unit (MPU), an application specific integrated circuit (ASIC), a field programmable gate array (FPGA), or the like, with a storage area such as RAM as a work area. In the example illustrated in FIG. 5, the control unit 110 includes a generation unit 111, an estimation unit 112, a calculation unit 113, and the drive control unit 114.

The generation unit 111 performs the function of the walking command generator illustrated in FIG. 1. Specifically, the generation unit 111 acquires the target translational velocity and the target turning angular velocity of the robotic apparatus 1 and the instruction on walking (gait) of the robotic apparatus 1 that the input unit 11 receives from the user. Subsequently, the generation unit 111 generates the walking command for the robotic apparatus 1, on the basis of the target translational velocity and the target turning angular velocity of the robotic apparatus 1 and the instruction on walking (gait) of the robotic apparatus 1. The generation unit 111 generates the walking commands corresponding to various kinds of walking such as a crawl, walk, trot, and gallop. The instruction on walking (gait) of the robotic apparatus 1 can also be referred to as instruction on the way of making contact with the ground of each of the four legs of the robotic apparatus 1.

For example, the crawl represents walking in which three of the four legs of the robotic apparatus 1 that are always in contact with the ground are moved backward at the same speed to move the body of the robotic apparatus 1 forward. In addition, the trot represents walking in which pairs of two legs (a right front leg and a left rear leg and a left front leg and a right rear leg) positioned diagonally of the four legs of the robotic apparatus 1 are alternately moved.

In addition, the generation unit 111 performs the function of the gait generator illustrated in FIG. 1. Specifically, the generation unit 111 generates the chart (hereinafter, also referred to as the gait chart) indicating the walking pattern of the robotic apparatus 1 as illustrated in FIG. 2, on the basis of the walking command generated (by the walking command generator). FIG. 2 is a diagram illustrating an exemplary generation of the gait of the robotic apparatus 1 according to the embodiment. FIG. 2 illustrates the gait charts corresponding to four kinds of walking of the crawl, walk, trot with no flight phase, and trot with flight phase, from the upper part to the lower part. Here, the flight phase represents a duration in which none of the four legs of the robotic apparatus 1 is in contact with the ground (floating in the air).

The horizontal axis of each of the gait charts illustrated in FIG. 2 represents time. In addition, the vertical axis of each gait chart represents whether the left front leg (FL), the right front leg (FR), the left rear leg (RL), and the right rear leg (RR) of the four legs of the robotic apparatus 1 are in contact with the ground at the corresponding time. Hereinafter, of the legs of the robotic apparatus 1, a leg in contact with the ground is referred to as ground contact leg or supporting leg. Furthermore, of the legs of the robotic apparatus 1, a leg not in contact with the ground (i.e., a leg floating in the air) is referred to as swing leg. Furthermore, coordinates indicating the positions of the toes of the four legs of the robotic apparatus 1 in each gait are determined from a relative positional relationship between the four legs of the robotic apparatus 1 in each gait.

In each of the gait charts illustrated in FIG. 2, a gray-colored duration indicates a swing duration in which the corresponding leg is the swing leg. Furthermore, a non-gray-colored duration indicates a ground contact duration in which the corresponding leg is the ground contact leg. Furthermore, a duration in which each leg of the robotic apparatus 1 has a constant ground contact pattern is regarded as one step. For example, in a crawl gait chart illustrated in the upper part of FIG. 2, a duration from time t=0 to time t=0.25 indicates a duration in which the robotic apparatus 1 takes the first step. Furthermore, when t=0.25, the robotic apparatus 1 lands one step ahead. A duration from time t=0.25 to time t=0.5 indicates a duration in which the robotic apparatus 1 takes the second step. When t=0.5, the robotic apparatus 1 lands two steps ahead.

A duration from time t=0.5 to time t=0.75 indicates a duration in which the robotic apparatus 1 takes the third step. When t=0.75, the robotic apparatus 1 lands three steps ahead. A duration from time t=0.75 to time t=1.0 indicates a duration in which the robotic apparatus 1 takes the fourth step. When t=1.0, the robotic apparatus 1 lands four steps ahead. In addition, the second gait chart adjacent to the first gait chart is a repeated pattern of the first gait chart from time t=0 to time t=1.0, but shows a gait pattern from time t=1.0 to time t=2.0 following the time of the first gait chart. In addition, the third gait chart adjacent to the second gait chart is a repeated pattern of the first gait chart from time t=0 to time t=1.0, but shows a gait pattern from time t=2.0 to time t=3.0 following the time of the second gait chart.

In addition, the generation unit 111 generates the gait chart and generates the landing point coordinates indicating the planned landing point position of the landing point position to which the current swing leg of the robotic apparatus 1 to land next. For example, based on the crawl gait chart illustrated in the upper part of FIG. 2, the current swing leg of the robotic apparatus 1 in the duration of the first step from time t=0 to time t=0.25 is the left front leg (FL). Therefore, the generation unit 111 generates the landing point coordinates indicating the planned landing point position of the landing point position located one step ahead to which the left front leg (FL) being the current swing leg of the robotic apparatus 1 to land next (in this case, time t=0.25).

In addition, the generation unit 111 performs the function of the future support point predictor illustrated in FIG. 1. Specifically, the generation unit 111 generates, from the gait chart generated (by the gait generator), the array of support point coordinates (hereinafter, also referred to as support point array) indicating the planned support point positions (hereinafter, also referred to as the planned support point positions for N steps ahead) obtained by averaging the ground contact point coordinates indicating the planned ground contact point positions of the ground contact legs of the robotic apparatus 1 over N steps (N is a natural number).

Here, the support point array generated by the generation unit 111 will be specifically described with the crawl gait chart illustrated in the upper part of FIG. 2 as an example. For example, in the duration (the first step) from time t=0 to time t=0.25, the left front leg (FL) of the robotic apparatus 1 is the swing leg, and the right front leg (FR), the left rear leg (RL), and the right rear leg (RR) are the ground contact legs. Therefore, the generation unit 111 calculates the support point coordinates indicating a planned support point position one step ahead obtained by averaging the ground contact point coordinates indicating the planned ground contact point positions of the right front leg (FR), the left rear leg (RL), and the right rear leg (RR) that are the ground contact legs of the robotic apparatus 1 one step ahead.

Subsequently, in the duration (the second step) from time t=0.25 to time t=0.5, the right rear leg (RR) of the robotic apparatus 1 is the swing leg, and the left front leg (FL), the right front leg (FR), and the left rear leg (RL) are the ground contact legs. Therefore, the generation unit 111 calculates the support point coordinates indicating a planned support point position two steps ahead obtained by averaging the ground contact point coordinates indicating the planned ground contact point positions of the left front leg (FL), the right front leg (FR), and the left rear leg (RL) that are the ground contact legs of the robotic apparatus 1 two steps ahead.

Subsequently, in the duration (the third step) from time t=0.5 to time t=0.75, the right front leg (FR) of the robotic apparatus 1 is the swing leg, and the left front leg (FL), the left rear leg (RL), and the right rear leg (RR) are the ground contact legs. Therefore, the generation unit 111 calculates the support point coordinates indicating a planned support point position three steps ahead obtained by averaging the ground contact point coordinates indicating the planned ground contact point positions of the left front leg (FL), the left rear leg (RL), and the right rear leg (RR) that are the ground contact legs of the robotic apparatus 1 three steps ahead.

Subsequently, in the duration (the fourth step) from time t=0.75 to time t=1.0, the left rear leg (RL) of the robotic apparatus 1 is the swing leg, and the left front leg (FL), the right front leg (FR), and the right rear leg (RR) are the ground contact legs. Therefore, the generation unit 111 calculates the support point coordinates indicating a planned support point position four steps ahead obtained by averaging the ground contact point coordinates indicating the planned ground contact point positions of the left front leg (FL), the right front leg (FR), and the right rear leg (RR) that are the ground contact legs of the robotic apparatus 1 four steps ahead. For the following time, similarly, the generation unit 111 calculates the support point coordinates indicating the planned support point positions for N steps ahead.

In this manner, the generation unit 111 generates the support point array (the support point coordinates of the first step, the support point coordinates of the second step, the support point coordinates of the third step, . . . , the support point coordinates of the Nth step) over N steps that is a column in which N sets of support point coordinates indicating the planned support point positions of the first step to the Nth step are arranged. Note that, in the following description, the OO point array (OO is a point name) represents a column in which N sets of OO point coordinates indicating the OO point positions of the first step to the Nth step of the robotic apparatus 1 are arranged.

The estimation unit 112 performs the function of the attitude estimator illustrated in FIG. 1. Specifically, the estimation unit 112 estimates the attitude angle and the attitude angular velocity of the robotic apparatus 1 on the basis of the acceleration and angular velocity of the robotic apparatus 1 detected by the inertial measurement unit (IMU) mounted on the robotic apparatus 1.

In addition, the estimation unit 112 performs the function of the self-localization device illustrated in FIG. 1. Specifically, the estimation unit 112 estimates the basic position and the basic attitude, the basic joint angle and the basic joint angular velocity of the robotic apparatus 1, on the basis of the motor angle of a joint of the robotic apparatus 1 detected by the encoder mounted on the joint of the robotic apparatus 1 and the attitude angle and the attitude angular velocity of the robotic apparatus 1 estimated (by the attitude estimator).

In addition, the estimation unit 112 performs the function of the center of gravity estimator illustrated in FIG. 1. Specifically, the estimation unit 112 calculates the reaction force that each of the legs receives from the ground contact surface, on the basis of the torque applied to each joint of the leg of the robotic apparatus 1. The estimation unit 112 estimates the horizontal position of the current center of gravity of the robotic apparatus 1, on the basis of the magnitude of the reaction force received by each leg from the ground contact surface. Furthermore, the estimation unit 112 estimates the horizontal velocity of the current center of gravity of the robotic apparatus 1, on the basis of the horizontal position of the center of gravity of the robotic apparatus 1. In addition, the estimation unit 112 estimates the vertical position of the current center of gravity of the robotic apparatus 1 by performing geometric calculation by using the horizontal position of the center of gravity of the robotic apparatus 1 in the plurality of attitudes. Furthermore, the estimation unit 112 estimates the vertical velocity of the current center of gravity of the robotic apparatus 1, on the basis of the vertical position of the center of gravity of the robotic apparatus 1.

The calculation unit 113 performs the function of the center of gravity vertical stabilizer illustrated in FIG. 1. Specifically, the estimation unit 112 calculates the vertical positions (also referred to as vertical trajectories) of the center of gravity of the robotic apparatus 1 and the target resultant forces or the target positions, for N steps ahead, on the basis of the reference vertical position of the center of gravity of the robotic apparatus 1, the vertical position and vertical velocity of the current center of gravity of the robotic apparatus 1 estimated (by the center of gravity estimator), and the support point array over N steps generated by the generation unit 111.

In addition, the calculation unit 113 performs the function of the center of gravity horizontal stabilizer illustrated in FIG. 1. Inside the center of gravity horizontal stabilizer, the planned support point is treated as a target center of pressure. Specifically, the calculation unit 113 calculates the amount of change in the landing point of the landing point position to which the current swing leg of the robotic apparatus 1 to land next from the planned landing point position, and the amount of change in the center of pressure of the position of the center of pressure to be generated by the current ground contact leg of the robotic apparatus 1 from the position of the target center of pressure, on the basis of the horizontal position and the horizontal velocity of the current center of gravity of the robotic apparatus 1, the planned support point positions (positions of the target center of pressure) of the robotic apparatus 1 for N steps ahead, and the vertical positions of the center of gravity of the robotic apparatus 1 for N steps ahead calculated (by the center of gravity vertical stabilizer). The calculation unit 113 calculates a minimum value of the amount of change in the landing point and a minimum value of the amount of change in the center of pressure.

In addition, the calculation unit 113 performs the function of the leg tip trajectory generator illustrated in FIG. 1. Specifically, the calculation unit 113 calculates the target leg tip position that is the landing point position to which the current swing leg of the robotic apparatus 1 to land next, on the basis of the planned landing point position generated by the generation unit 111 and the amount of change in the landing point calculated (by the center of gravity horizontal stabilizer).

The drive control unit 114 achieves the position of the center of pressure and the target leg tip position that stabilize the robotic apparatus 1 by using the whole-body cooperative control using the generalized inverse dynamics (GID) in the actual robotic apparatus 1. Specifically, the drive control unit 114 controls the attitude and movement of the robotic apparatus 1 so as to achieve the position of the center of pressure and the target leg tip position that are calculated by the calculation unit 113. More specifically, the drive control unit 114 calculates a joint driving force (torque) to be generated in each joint of the robotic apparatus 1 so as to achieve the position of the center of pressure and the target leg tip position that are calculated by the calculation unit 113. For example, the drive control unit 114 calculates the joint driving force (torque) to be generated in each joint of the robotic apparatus 1, on the basis of a total state quantity (the basic position and the basic attitude, and the basic joint angle and the basic joint angular velocity) of the robotic apparatus 1 estimated by the estimation unit 112, a target attitude angle specified by the user, the target resultant force or target position, the position of the center of pressure, and the target leg tip position that are calculated by the calculation unit 113. Subsequently, the drive control unit 114 controls the operation of each joint of the robotic apparatus 1 so as to generate the calculated joint driving force (torque) in each joint of the robotic apparatus 1.

3. Overview of Internal Algorithm in Center of Gravity Horizontal Stabilizer The center of gravity horizontal stabilizer according to the present embodiment handles a horizontal direction ((X, Y) direction) of the robotic apparatus 1. A vertical direction (Z direction) of the robotic apparatus 1 is separately designed in another module (the center of gravity vertical stabilizer shown in FIG. 1), and is given as an input to this module (the center of gravity horizontal stabilizer). In this way, nonlinearity in the vertical direction is handled as a time-varying linearization system.

The overview of an internal algorithm in the center of gravity horizontal stabilizer includes the following three steps. As described above, the planned support point is treated as the target center of pressure (target CoP) inside the center of gravity horizontal stabilizer. Therefore, hereinafter, the support point array may be referred to as target pressure center array (also referred to as target CoP array).

Step #1: States of the horizontal position and horizontal velocity of the center of gravity of the robotic apparatus 1 N steps ahead are modeled including a flight phase, the states including the horizontal position and horizontal velocity of the current center of gravity of the robotic apparatus 1, the support point array (a target center of pressure array) of the support point coordinates indicating the planned support point positions (positions of the target center of pressure) of the robotic apparatus 1 for N steps ahead, a ground contact point array of the ground contact point coordinates indicating the planned ground contact point positions of the ground contact legs of the robotic apparatus 1 for N steps ahead, an array of amounts of change in the center of pressure (an array of amounts of change in the support point) of the amount of change in the center of pressure (an amount of change in the support point), from the position of the target center of pressure (planned support point position), of the position of the center of pressure (support point position) to be generated by the ground contact legs of the robotic apparatus 1 for N steps ahead, and an array of amounts of change in the landing point of the amount of change in the landing point from the planned landing point position of the landing point position to which the swing leg of the robotic apparatus 1 to land next for N steps ahead.

Step #2: For a state of the center of gravity of the robotic apparatus 1 N steps ahead, the array of amounts of change in the center of pressure (array of amounts of change in the support point) and the array of amounts of change in the landing point of the robotic apparatus 1 for N steps ahead are obtained, by using stabilization conditions as constraint conditions (capture point and limit cycle).

Step #3: The latest amounts of change (i.e., the latest amount of change in the center of pressure and amount of change in the landing point) in Step #2 is output, and achieved in the robotic apparatus 1.

[3-1. Modeling Method]

A modeling method for the internal algorithm in the center of gravity horizontal stabilizer in Step #1 will be described with reference to FIGS. 6 to 9.

Figure 6:
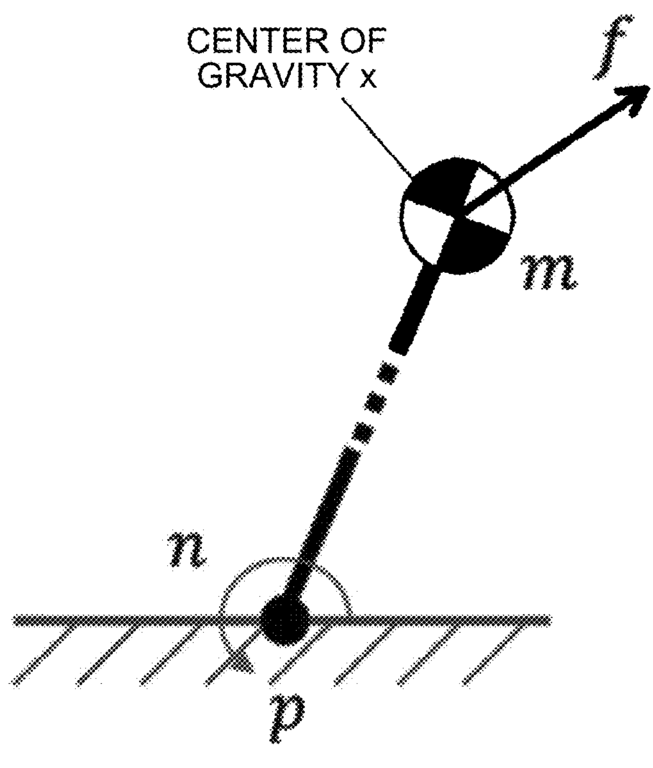
FIG. 6 is a diagram illustrating a center of gravity-center of pressure model for the robotic apparatus according to the embodiment.

FIG. 6 is a diagram illustrating the center of gravity-center of pressure model for the robotic apparatus 1 according to the embodiment. As illustrated in FIG. 6, the calculation unit 113 considers the control model for the robotic apparatus 1 as the center of gravity-center of pressure model including the center of gravity and the support point (center of pressure) of the robotic apparatus 1, and calculates the equation of motion of the center of gravity of the robotic apparatus 1 for N steps ahead, with the amount of change in the support point (amount of change in the center of pressure) and the amount of change in the landing point, as the unknown parameters.

In FIG. 6, the center of gravity-center of pressure model is considered in which a gravity center mass of the robotic apparatus 1 is m, a force acting on the center of gravity of the robotic apparatus 1 is f, a position of the center of gravity of the robotic apparatus 1 is $x=(x_c,y_c,z_c)$, a position of the support point (center of pressure) of the robotic apparatus 1 is $p=(p_x,p_y,p_z)$, and a moment n acting around the support point is n.

With the use of the model illustrated in FIG. 6, the equation of motion of the center of gravity viewed from global coordinates is expressed by Formula (1) below.

$$m\ddot{x} = f - mg \tag{1}$$

In addition, an equation of motion of the angular momentum of the center of gravity viewed from the global coordinates is expressed by Formula (2) below.

$$\dot{L} = (p - x) \times f + n \tag{2}$$

Here, when it is assumed that L=0 and n=0 and f obtained from Formula (1) is substituted in Formula (2), Formulas (3) to (5) below are obtained.

$$(p - x) \times m\ (\ddot{x} + g) = 0 \tag{3}$$

$$\begin{bmatrix} p_x - x_c \\ p_y - y_c \\ p_z - z_c \end{bmatrix} \times m \begin{bmatrix} \ddot{x}_c \\ \ddot{y}_c \\ \ddot{z}_c + g \end{bmatrix} = 0 \tag{4}$$

$$\begin{bmatrix} (p_y - y_c)\ (\ddot{z}_c + g) - (p_z - z_c)\ddot{y}_c \\ (p_z - z_c)\ddot{x}_c - (p_x - x_c)\ (\ddot{z}_c + g) \\ (p_x - x_c)\ddot{y}_c - (p_y - y_c)\ddot{x}_c \end{bmatrix} = 0 \tag{5}$$

The equation of motion of the center of gravity viewed from the global coordinates was obtained by Formula (5) described above.

Next, Formula (5) is replaced with an equation of motion viewed from a support point position p. Assuming that the position of the center of gravity viewed from the support point position p is (X, Y, Z), Formula (6) below can be obtained.

$$X = x_c = p_x \\ Y = y_c - p_y \\ Z = z_c - p_z \tag{6}$$

Here, assuming that the support point position p is fixed, an equation of motion viewed from the support point in a horizontal direction, represented by Formula (7) below, is obtained from Formulas (5) and (6).

$$\ddot{X} = \frac{\ddot{Z} + g}{Z} X \tag{7}$$

Assuming that the element of Z in Formula (7) above is independently controlled and known in a higher-order control system, Z can be treated as a trivial time function, and Formula (7) above can be considered as a time-varying linear system as shown in Formula (8) below.

$$\ddot{X} = \alpha(t)X \\ \alpha(t) = \frac{\ddot{Z(t)} + g}{Z(t)} \tag{8}$$

Formula (8) above is derived for the X direction, but the formula also holds for the Y direction, and only the X direction will be described below.

Figure 7:
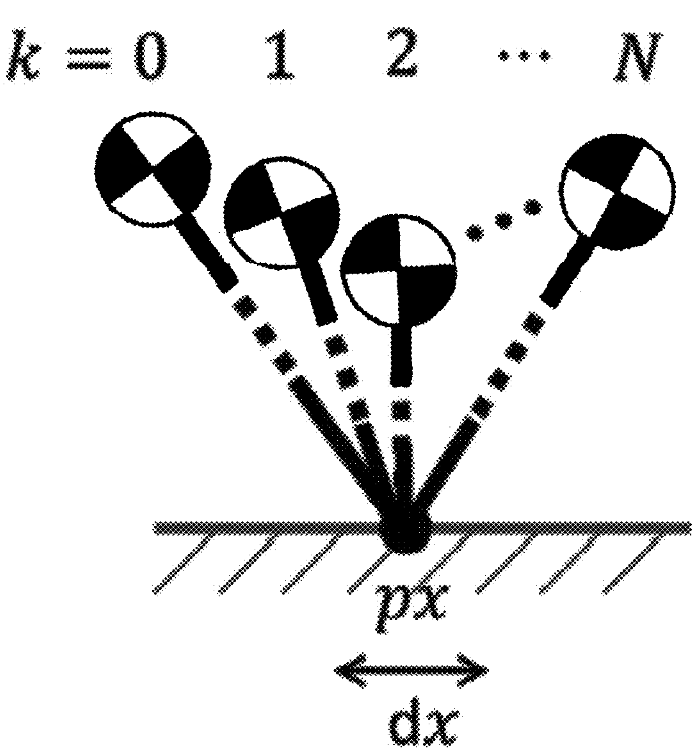
FIG. 7 is a diagram illustrating a stepwise center of gravity-center of pressure model according to the embodiment.

FIG. 7 is a diagram illustrating a stepwise center of gravity-center of pressure model according to the embodiment. In FIG. 7, transition dynamics when the movement of the center of gravity is changed every dt steps from a certain time k=0 to N is considered. In FIG. 7, it is assumed that $p_x$ is the planned support point position (position of the target center of pressure), dx is the amount of change in the support point (amount of change in the center of pressure) of the support point position (position of the center of pressure) from the planned support point position (position of the target center of pressure) $p_x$, and the planned support point position $p_x$ is unchanged during the time k=0 to N.

Using the model illustrated in FIG. 7, a discretization formula of the motion of the center of gravity in the horizontal direction is given as Formula (9) below.

$$X_{k+1} = X_k + dt\dot{X}_k + \frac{1}{2}dt^2\ddot{X}_k \\ \dot{X_{k+1}} = \dot{X}_k + dt\ddot{X}_k \tag{9}$$

Here, when α(t) of Formula (8) above is substituted, as $\alpha_k$, in Formula (9) above every k steps and the support point position is treated as moving in parallel by dx, state space representation is given by Formula (10) below.

$$\begin{bmatrix} X_{k+1}-d_x \\ \dot{X}_{k+1} \end{bmatrix} = A_k \begin{bmatrix} X_k - d_x \\ \dot{X}_k \end{bmatrix} \tag{10}$$

$$A_k = \begin{bmatrix} 1+\frac{\alpha_k}{2}dt^2 & dt \\ \alpha_k dt & 1 \end{bmatrix}$$

In Formula (10) above, Ak can be obtained from dt which is a constant and time-varying $\alpha_k$, and if $\alpha_k$ and dx are given, the states for N steps ahead can be obtained. A transition formula from an initial state $X_0$ for N steps ahead is expressed by Formula (11) below.

$$\begin{bmatrix} X_N-d_x \\ \dot{X}_N \end{bmatrix} = \prod_{i=0}^{N-1} A_i \begin{bmatrix} X_0 - d_x \\ \dot{X}_0 \end{bmatrix} \tag{11}$$

Figure 8:
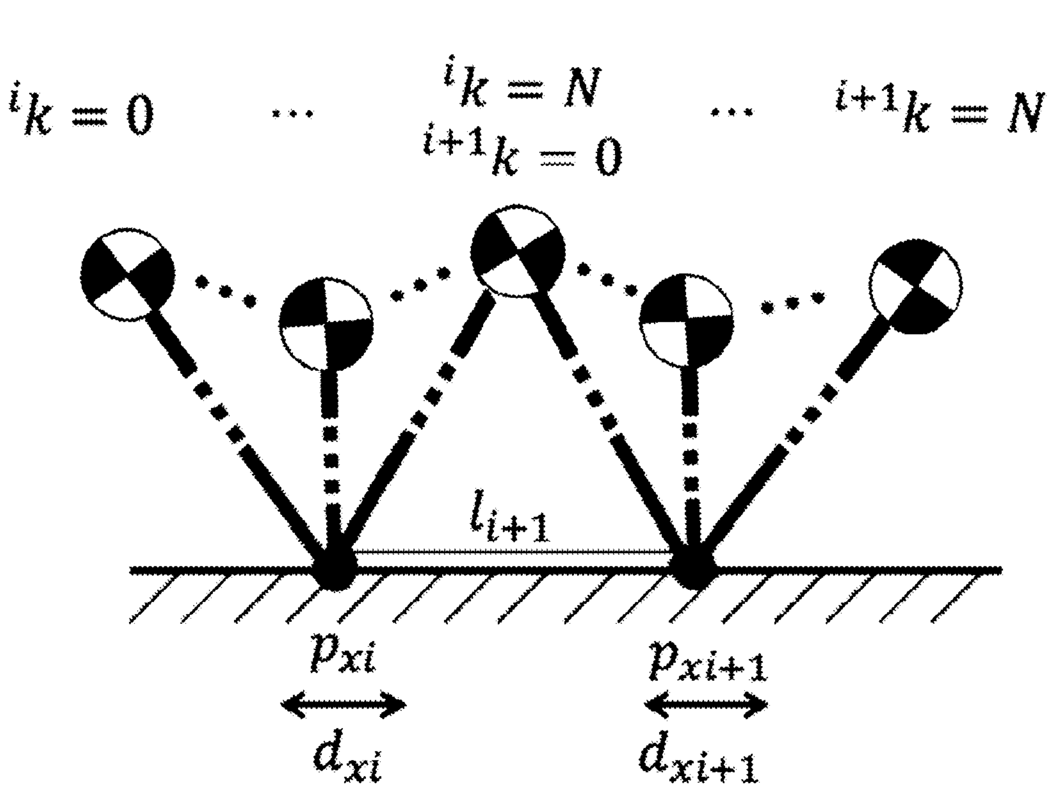
FIG. 8 is a diagram illustrating a center of gravity-center of pressure model showing the change of a support point, according to the embodiment.

FIG. 8 is a diagram illustrating the center of gravity-center of pressure model showing the change of the support point, according to the embodiment. In FIG. 8, a state of the ith step of the robotic apparatus 1 is considered. Furthermore, in FIG. 8, the planned support point position (position of the target center of pressure) in the ith step of the robotic apparatus 1 is set as $p_{xi}$. In addition, FIG. 8 illustrates a state where the planned support point position (position of the target center of pressure) is changed from the planned support point position (position of the target center of pressure) $p_{xi}$ to a planned support point position (position of the target center of pressure) $p_{xi+1}$ by $l_{i+1}$, in the Nth step obtained in FIG. 7. From Formula (11) above, the transition dynamics from ${}^{i}$k=0 to N is given by Formula (12) below.

$$\begin{bmatrix} {}^{pi}X_{i+1} \\ \dot{X}_{i+1} \end{bmatrix} = A_i \begin{bmatrix} {}^{pi}X_i \\ \dot{X}_i \end{bmatrix} + (1-A_i)\begin{bmatrix} 1 \\ 0 \end{bmatrix} d_{xi} \tag{12}$$

$$A_i = \prod_{j=0}^{N-1} A_j$$

In Formula (12) above, ${}^{pi}X_i$ is the position of the center of gravity viewed from the planned support point position (position of the target center of pressure) $p_{xi}$ at ${}^{i}$k=0 and ${}^{pi}X_{i+1}$ is the position of the center of gravity viewed from the planned support point position (position of the target center of pressure) $p_{xi}$ at ${}^{i}$k=N in FIG. 8. Furthermore, the motion of the center of gravity at ${}^{i}$k=N viewed from the planned support point position (position of the target center of pressure) $p_{xi+1}$ after changing is given by Formula (13) below.

$$\begin{bmatrix} {}^{pi+1}X_{i+1} \\ \dot{X}_{i+1} \end{bmatrix} = \begin{bmatrix} {}^{pi}X_{i+1} \\ \dot{X}_{i+1} \end{bmatrix} - \begin{bmatrix} 1 \\ 0 \end{bmatrix} l_{i+1} \tag{13}$$

$$l_{i+1} = p_{i+1} - p_i$$

When Formula (12) above is substituted in Formula (13) above, dynamics with the change of the planned support point position (position of the target center of pressure) can be given by Formula (14) below.

$$\begin{bmatrix} {}^{pi+1}X_{i+1} \\ \dot{X}_{i+1} \end{bmatrix} = A_i \begin{bmatrix} {}^{pi}X_i \\ \dot{X}_i \end{bmatrix} + (1-A_i)\begin{bmatrix} 1 \\ 0 \end{bmatrix} d_{xi} - \begin{bmatrix} 1 \\ 0 \end{bmatrix} l_{i+1} \tag{14}$$

Next, the flight phase is considered. Here, the flight phase represents a duration in which none of the legs of the robotic apparatus 1 is in contact with the ground (floating in the air). For example, it is assumed that the flight phase is adjacent to that before the planned support point position (position of the target center of pressure) change after an installation duration at ${}^{i}$k=N in FIG. 8. In the flight phase, the translational motion is a uniform linear motion, and therefore, Formula (15) below holds.

$$\begin{bmatrix} {}^{pi}X_{i+1} \\ \dot{X}_{i+1} \end{bmatrix} = \begin{bmatrix} 1 & \delta i \\ 0 & 1 \end{bmatrix} \left( A_i \begin{bmatrix} {}^{pi}X_i \\ \dot{X}_i \end{bmatrix} + (1-A_i)\begin{bmatrix} 1 \\ 0 \end{bmatrix} d_{xi} \right) \tag{15}$$

$\delta i$: Flight duration

When Formula (15) above is substituted in Formula (13) above, dynamics with the flight phase can be given by Formula (16) below.

$$\begin{bmatrix} {}^{pi+1}X_{i+1} \\ \dot{X}_{i+1} \end{bmatrix} = \begin{bmatrix} 1 & \delta i \\ 0 & 1 \end{bmatrix} \left( A_i \begin{bmatrix} {}^{pi}X_i \\ \dot{X}_i \end{bmatrix} + (1-A_i)\begin{bmatrix} 1 \\ 0 \end{bmatrix} d_{xi} \right) - \begin{bmatrix} 1 \\ 0 \end{bmatrix} l_{i+1} \tag{16}$$

Formula (16) above is equal to Formula (14) of the planned support point position (position of the target center of pressure) change dynamics when the flight phase is zero (i.e., the robotic apparatus 1 does not jump). As described above, it is possible to obtain a formula representing the planned support point position (position of the target center of pressure) change dynamics having the flight phase.

Next, when the planned support point position (position of the target center of pressure) change represented by Formula (16) above is performed N times, a formula representing transition dynamics over N steps, with the current state of the center of gravity as an initial value is obtained. When $l_{i+1}$ of Formula (16) above is newly expressed as a sum of planned step length $l_{i+1}$ and an amount $dl_{i+1}$ of change with respect to the step length $l_{i+1}$, Formula (17) below is obtained.

$$\hat{x}_{i+1} = T_i\hat{x}_i + S_i\begin{bmatrix} 1 \\ 0 \end{bmatrix} d_{xi} - \begin{bmatrix} 1 \\ 0 \end{bmatrix} l_{i+1} - \begin{bmatrix} 1 \\ 0 \end{bmatrix} dl_{i+1} \tag{17}$$

$$\hat{x}_{i+1} = \begin{bmatrix} {}^{pi+1}X_{i+1} \\ \dot{X}_{i+1} \end{bmatrix}$$

$$F_i = \begin{bmatrix} 1 & \delta i \\ 0 & 1 \end{bmatrix}$$

$$T_i = F_i A_i$$

$$S_i = F_i(1-A_{i)}$$

When dynamics at i=0~2 is calculated using Formula (17) above, Formulas (18) to (20) below are obtained.

$$i = 0 \tag{18}$$

$$\hat{x}_1 = T_0\hat{x}_0 + S_0\begin{bmatrix} 1 \\ 0 \end{bmatrix} d_{x0} - \begin{bmatrix} 1 \\ 0 \end{bmatrix} l_1 - \begin{bmatrix} 1 \\ 0 \end{bmatrix} dl_1$$

$$i = 1 \tag{19}$$

$$\hat{x}_2 = T_1\hat{x}_1 + S_1\begin{bmatrix} 1 \\ 0 \end{bmatrix} d_{x1} - \begin{bmatrix} 1 \\ 0 \end{bmatrix} l_2 - \begin{bmatrix} 1 \\ 0 \end{bmatrix} dl_2 =$$

-continued $$T_1 T_0 \hat{x}_0 + T_1 S_0 \begin{bmatrix} 1 \\ 0 \end{bmatrix} d_{x0} + S_1 \begin{bmatrix} 1 \\ 0 \end{bmatrix} dx_1 - T_1 \begin{bmatrix} 1 \\ 0 \end{bmatrix} dl_1 - \begin{bmatrix} 1 \\ 0 \end{bmatrix} dl_2 - T_1 \begin{bmatrix} 1 \\ 0 \end{bmatrix} l_1 - \begin{bmatrix} 1 \\ 0 \end{bmatrix} l_2$$

$i = 2$ $$\hat{x}_3 = T_2 \hat{x}_2 + S_2 \begin{bmatrix} 1 \\ 0 \end{bmatrix} d_{x2} - \begin{bmatrix} 1 \\ 0 \end{bmatrix} l_3 - \begin{bmatrix} 1 \\ 0 \end{bmatrix} dl_3 = T_2 T_1 T_0 \hat{x}_0 + T_2 T_1 S_0 \begin{bmatrix} 1 \\ 0 \end{bmatrix} d_{x0} + T_2 S_1 \begin{bmatrix} 1 \\ 0 \end{bmatrix} dx_1 + S_2 \begin{bmatrix} 1 \\ 0 \end{bmatrix} dx_2 - T_2 T_1 \begin{bmatrix} 1 \\ 0 \end{bmatrix} dl_1 - T_2 \begin{bmatrix} 1 \\ 0 \end{bmatrix} dl_2 - \begin{bmatrix} 1 \\ 0 \end{bmatrix} dl_3 - T_2 T_1 \begin{bmatrix} 1 \\ 0 \end{bmatrix} l_1 - T_2 \begin{bmatrix} 1 \\ 0 \end{bmatrix} l_2 - \begin{bmatrix} 1 \\ 0 \end{bmatrix} l_3$$

When the above expressions (18) to (20) are put together in a matrix form, Formula (21) below is obtained.

$$\begin{bmatrix} \hat{x}_1 \\ \hat{x}_2 \\ \hat{x}_3 \end{bmatrix} = \begin{bmatrix} T_0 \\ T_1 T_0 \\ T_2 T_1 T_0 \end{bmatrix} \hat{x}_0 + \begin{bmatrix} S_0 \begin{bmatrix} 1 \\ 0 \end{bmatrix} & 0 & 0 \\ T_1 S_0 \begin{bmatrix} 1 \\ 0 \end{bmatrix} & S_1 \begin{bmatrix} 1 \\ 0 \end{bmatrix} & 0 \\ T_2 T_1 S_0 \begin{bmatrix} 1 \\ 0 \end{bmatrix} & T_2 S_1 \begin{bmatrix} 1 \\ 0 \end{bmatrix} & S_2 \begin{bmatrix} 1 \\ 0 \end{bmatrix} \end{bmatrix} \begin{bmatrix} dx_0 \\ dx_1 \\ dx_2 \end{bmatrix} - \begin{bmatrix} \begin{bmatrix} 1 \\ 0 \end{bmatrix} & 0 & 0 \\ T_1 \begin{bmatrix} 1 \\ 0 \end{bmatrix} & \begin{bmatrix} 1 \\ 0 \end{bmatrix} & 0 \\ T_2 T_1 \begin{bmatrix} 1 \\ 0 \end{bmatrix} & T_2 \begin{bmatrix} 1 \\ 0 \end{bmatrix} & \begin{bmatrix} 1 \\ 0 \end{bmatrix} \end{bmatrix} \begin{bmatrix} dl_0 \\ dl_1 \\ dl_2 \end{bmatrix} - \begin{bmatrix} \begin{bmatrix} 1 \\ 0 \end{bmatrix} & 0 & 0 \\ T_1 \begin{bmatrix} 1 \\ 0 \end{bmatrix} & \begin{bmatrix} 1 \\ 0 \end{bmatrix} & 0 \\ T_2 T_1 \begin{bmatrix} 1 \\ 0 \end{bmatrix} & T_2 \begin{bmatrix} 1 \\ 0 \end{bmatrix} & \begin{bmatrix} 1 \\ 0 \end{bmatrix} \end{bmatrix} \begin{bmatrix} l_0 \\ l_1 \\ l_2 \end{bmatrix} \tag{21}$$

When Formula (21) above is generalized as the center of gravity state over N steps, Formula (22) below is obtained.

$$\hat{x}_N = \prod_{j=0}^{N-1} T_j \hat{x}_0 + \prod_{j=0}^{N-1} (T_{N-1} \ \dots \ T_{j+1}) S_j \begin{bmatrix} 1 \\ 0 \end{bmatrix} dx_j - \sum_{j=0}^{N-1} (T_{N-1} \ \dots \ T_{j+1}) \begin{bmatrix} 1 \\ 0 \end{bmatrix} dl_j - \sum_{j=0}^{N-1} (T_{N-1} \ \dots \ T_{j+1}) \begin{bmatrix} 1 \\ 0 \end{bmatrix} l_j \tag{22}$$

For use of only the final state, Formula (22) above is preferably used. In addition, for obtaining an intermediate trajectory, the intermediate trajectory can be calculated from Formula (21) above. As described above, from the initial state of the center of gravity, the center of gravity state N steps ahead in consideration of the amount of change in the support point (amount of change in the center of pressure), a planned value of the step length (corresponding to the planned landing point position), and an amount of change in the step length (corresponding to the amount of change in the landing point) was obtained.

Figure 9:
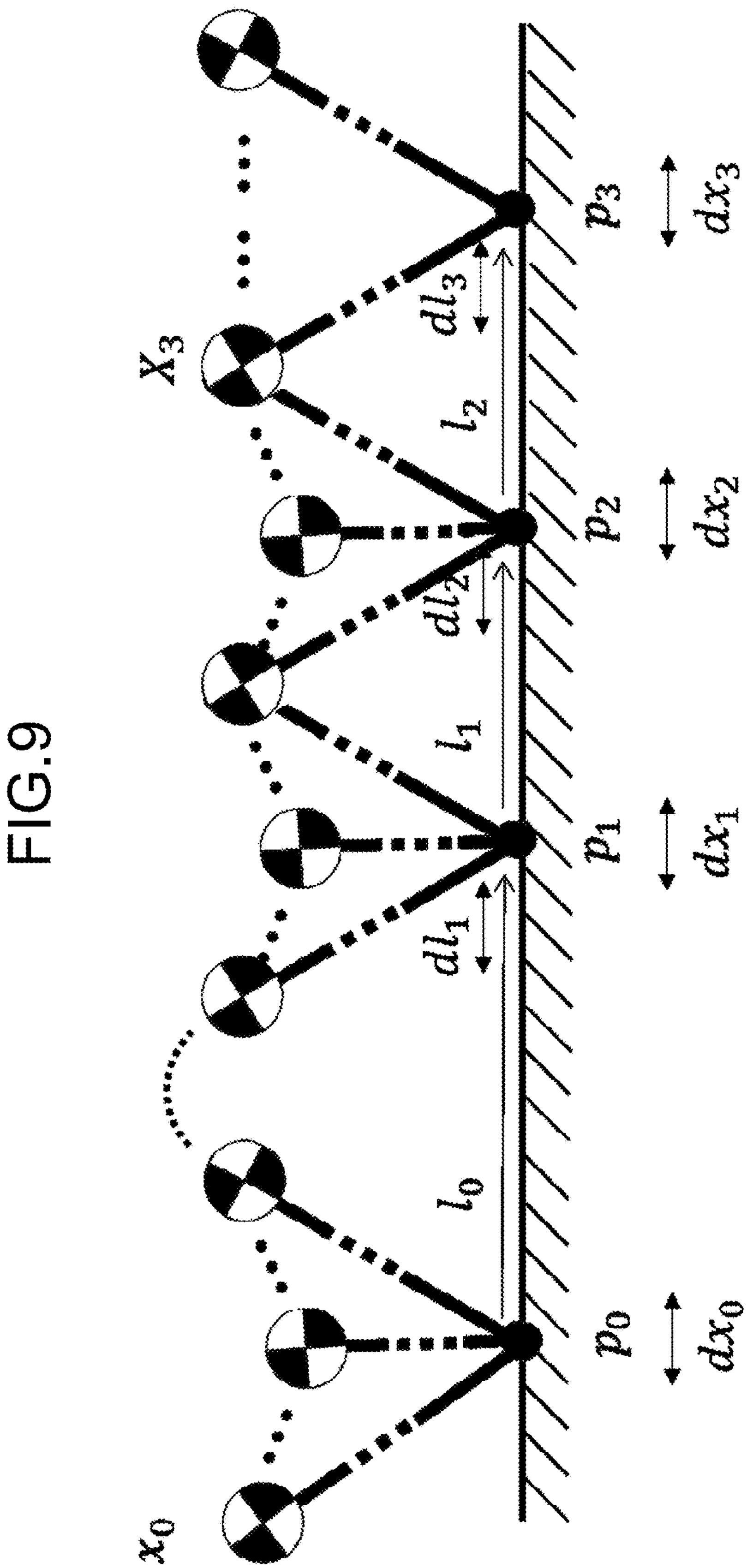
FIG. 9 is a diagram illustrating an image of a modeling result representing a center of gravity state N steps ahead (N=3) according to the embodiment.

FIG. 9 is a diagram illustrating an image of a modeling result representing the center of gravity state N steps ahead (N=3) according to the embodiment. FIG. 9 is a diagram illustrating an image of the modeling result representing the center of gravity state N steps behind when N=3 in Formula (22) above.

Formula (22) above shows the modeling result including the flight phase, and the point is to handle jumping of the robotic apparatus 1 as well. When there is no flight phase, $\delta i$ is preferably set to zero, requiring no switching of control models. In addition, in a case where a linear inverted pendulum having no vertical movement is assumed, it is unnecessary to calculate a time-varying matrix related to the vertical movement, modeling of transition up to the next step using an analytical solution is only required, and the amount of calculation can be reduced.

As described above, use of Formula (22) above makes it possible for the information processing device 100 to stabilize various gaits including jumping of the legged robotic apparatus with a low calculation amount and a single control model. Therefore, the information processing device 100 is allowed to express various walking patterns at low cost, for the legged robotic apparatus.

Furthermore, the information processing device 100 is configured to perform high-speed calculation by using Formula (22) above, and is operable to estimate the magnitude of the disturbance, on the basis of an amount of control. This configuration make is possible for the information processing device 100 to predict a large disturbance or instability that cannot be handled, in advance. Therefore, the user can cause the robotic apparatus to immediately take action for emergency stop or avoidance operation.

In addition, the algorithm of Formula (22) above is not a heuristic method. Therefore, the information processing device 100 can cope with robotic apparatuses having various shapes, with the same algorithm (Formula (22)).

[3-2. Description of Stable Condition, and Calculation of Array of Amounts of Change in Center of Pressure (Array of Amounts of Change in Support Point) and Array of Amounts of Change in Landing Point]

With reference to FIGS. 10 to 14, the description of a stable condition and the calculation of the array of amounts of change in the center of pressure (array of amounts of change in the support point) and the array of amounts of change in the landing point, in Step #2 of the internal algorithm in the center of gravity horizontal stabilizer will be described.

FIG. 10 is a diagram illustrating an equation of motion of the center of gravity after t seconds from landing of the Nth step according to the embodiment. As illustrated in FIG. 10, for the center of gravity state $X_N$ of the robotic apparatus 1 N steps ahead, a constraint for achievement of stabilization of the future state from $X_N$ is applied. This configuration makes it possible to consider stabilization using a plurality of steps and deal with strong disturbance that cannot be handled in one step. Assuming that a state after t seconds from $X_N(0)$ is $X_N(t)$ and the height is constant, the equation of motion therebetween can be expressed by using an analytical solution as represented by Formula (a) of FIG. 10. A distance from the floor to the center of gravity is h, a gravitational constant is g, and the motion is determined only by the initial state and time.

First, a stability criterion being the capture point will be described. Achieving a set of $X_N(0)$ and dotted $X_N(0)$ that make a divergent component of Formula (a) in FIG. 10 zero always converges $X_N(t)$ to zero at infinity, and stops immediately above the landing point. Such a landing point is called capture point. In order to achieve this, Formula (b) in FIG. 10 is preferably satisfied.

Figure 11:
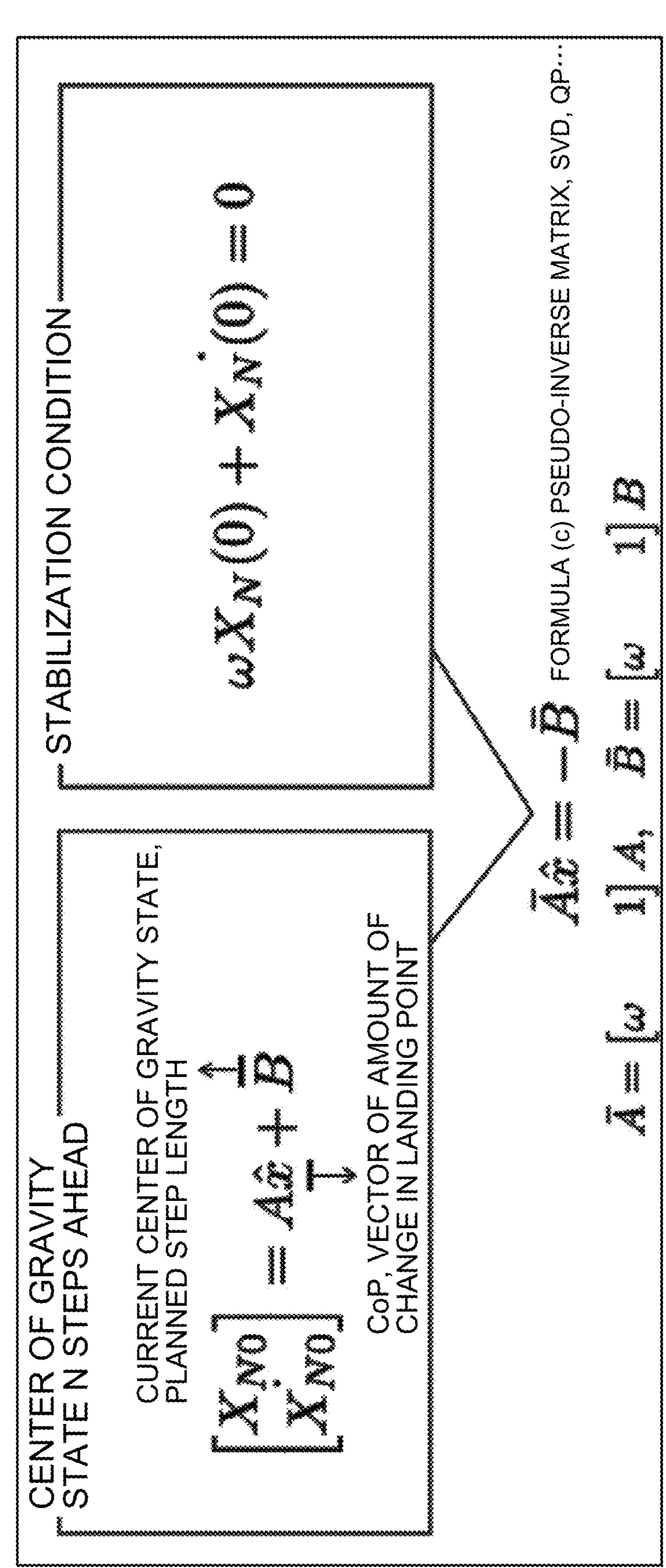
FIG. 11 is a diagram illustrating an equation of motion satisfying a stabilization condition (capture point) according to the embodiment.

Next, the amount of change in the center of pressure (amount of change in the support point) and the amount of change in the landing point are calculated using Formula (c) in FIG. 11. FIG. 11 is a diagram illustrating an equation of motion satisfying the stabilization condition (capture point) according to the embodiment. In Formula (c) of FIG. 11, hatted x is a variable vector, and includes an amount of change for each of N steps.

Figure 12:
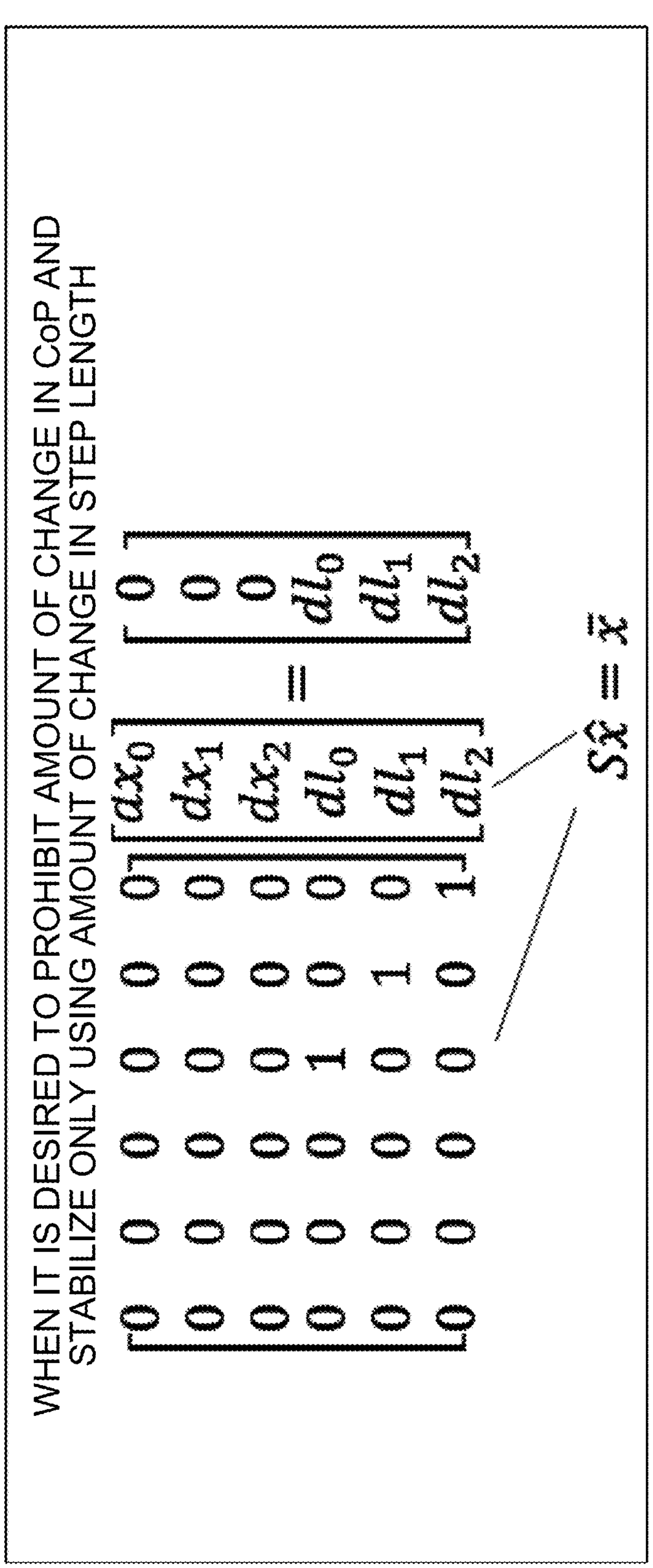
FIG. 12 is a diagram illustrating a configuration example of an output selection matrix used for stabilization according to the embodiment.

In addition, Formula (c) in FIG. 11 is generally a redundant system having more variables than the number of formulas, and has a plurality of solutions that satisfies the constraint. Therefore, minimum norm solution of the variables is preferably obtained using a weighted pseudo-inverse matrix, SVD, or the like, and the calculation can be performed at high speed. Furthermore, by multiplying the hatted x by a transformation matrix in which zero is forcibly substituted for the elements, it is possible to readily set a constraint of the amount of change in step length (corresponding to the amount of change in the landing point) and the amount of change in the center of pressure (amount of change in the support point) in a certain interval. A transformation example is illustrated in FIG. 12. FIG. 12 is a diagram illustrating a configuration example of an output selection matrix used for stabilization according to the embodiment.

By multiplying the hatted x in Formula (c) in FIG. 11 by the transformation matrix S illustrated in FIG. 12, zero is forcibly substituted for the variable, and stabilization can be performed without using the amount of change in the variable. The method of selecting the transformation matrix S can be easily set according to the gait and task of a robot, and there is an advantage that the same control model can be always used. For example, in a four-legged robot has a gait (also including jumping) that cannot form the support polygon, such as a trot or a gap, but at that time, the transformation matrix S is preferably set so that the variable for an operation amount at the center of pressure (support point) is zero.

However, when the stability criterion is the capture point, there are the following disadvantages. (1) A control adjustment parameter has only a weight minimizing the variable upon deriving a solution, having a low degree of freedom. (2) The stability criterion belongs to a preview control system that applies a constraint in the future and controls only a head state satisfying the condition, generating a steady-state error to a position of the target center of gravity and the speed. (3) The stability criterion is vulnerable to an error in modeling the center of gravity.

Figure 13:
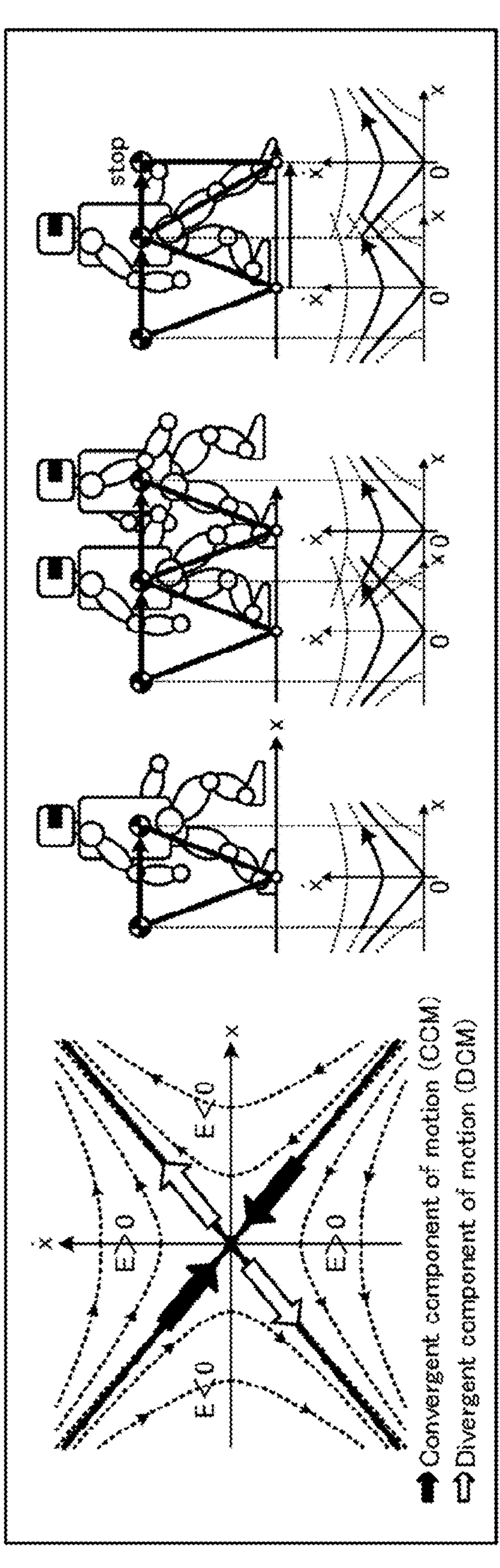
FIG. 13 is a diagram illustrating a relationship between orbital energy and walking motion according to the embodiment.

The stability criterion is then extended to the limit cycle. A termination stabilization condition when the stability criterion is the capture point is extended from "stop at infinity" to the limit cycle constraint. The limit cycle is a closed trajectory in phase space in a dynamical system, and is a phenomenon in which a constant relationship between position and speed is maintained. In the present embodiment, a constraint expression in which the limit cycle is formed at the termination time is derived. First, orbital energy E is considered in order to calculate the limit cycle trajectory in which the robotic apparatus 1 does not tumble. In steady-state walking in the linear inverted pendulum mode assuming a constant height, the orbital energy always works in a region satisfying E>0, as illustrated in FIG. 13. FIG. 13 is a diagram illustrating a relationship between the orbital energy and walking motion according to the embodiment.

Figure 14:
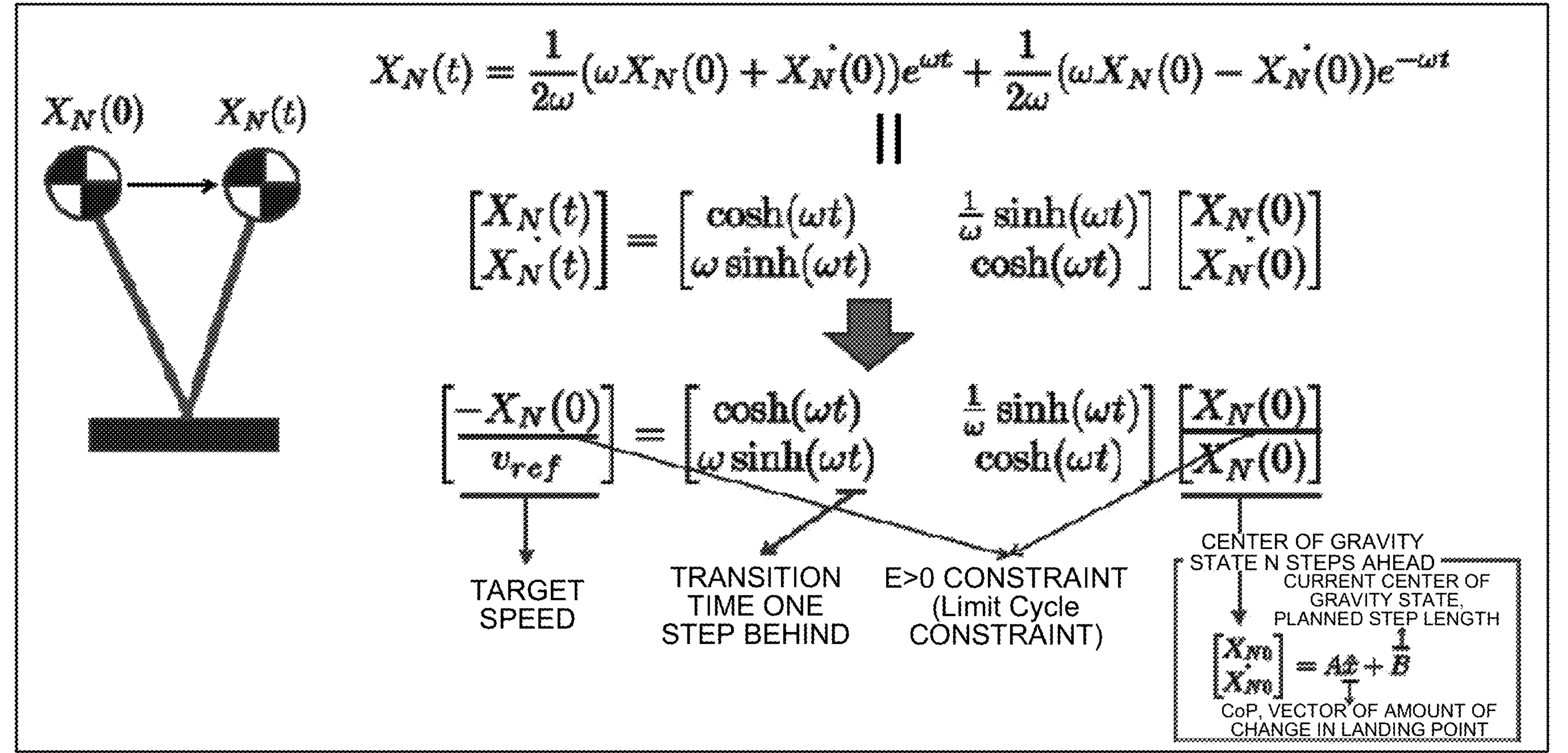
FIG. 14 is a diagram illustrating an equation of motion satisfying a stabilization condition (limit cycle) according to the embodiment.

The limit cycle constraint is applied to set a termination constraint condition so that the position of the center of gravity and speed upon landing of the Nth step is E>0 at time t after the landing, and therefore, it is possible to generate a motion without tumbling N steps ahead and a rapid change in the step length does not occur. The constraint expression satisfying these conditions is illustrated in FIG. 14. FIG. 14 is a diagram illustrating an equation of motion satisfying the stabilization condition (limit cycle) according to the embodiment. Using the duality in position when the linear inverted pendulum repeats a steady motion, the position of $X_N(t)$ is inverted in sign to the position of $X_N(0)$ immediately after landing. This is a constraint expression for obtaining $X_N(0)$ that forces E>0 while satisfying the target speed at time t after landing.

When the stability criterion is the capture point, which is the condition of stopping at infinity, there was no setting change parameter of the termination condition reflecting the current center of gravity state, and dynamic change was impossible. However, using $v_{ref}$ illustrated in FIG. 14 made it possible to set the termination condition from the current center of gravity state. For example, when $K_p$ is a feedback gain to deviation and $K_i$ is a feedback gain to a deviation integration value, $v_{ref}$ is designed as in Formula (23) below.

$$v_{ref} = \hat{v}_{ref} - \left(K_p e(t) + K_i \int_0^t e(t)dt\right) \tag{23}$$

In Formula (23) above, if an error e(t) is given as a difference from the current speed with hatted $v_{ref}$ as a speed command value from the user, an integrator is introduced for the speed, and robustness can be achieved. The same applies to the position. When it is desired to eliminate a deviation upon standing, the error e(t) is preferably calculated as a difference from the position. This means that the future height of a region E>0 is controlled on the basis of the current center of gravity state and a motion purpose to be achieved in the future. At any height (i.e., speed) in the phase space, E>0 is always secured, and stability can be guaranteed. In this manner, the information processing device 100 is configured to adjust the amount of control according to the purpose of the user. Therefore, although the steady-state error generally remains in the prediction control system, the information processing device 100 can solve the remaining steady-state error.

4. Application Examples

The amount of change in the center of pressure (amount of change in the support point) and the amount of change in the landing point, which are output values from the center of gravity horizontal stabilizer according to the present embodiment, can also be used for higher-order situation determination for the purposes other than the stabilization of the robotic apparatus 1.

(Example 1) Even if no special sensor is mounted, the user can estimate whether the disturbance is input from which direction on the basis of the amount of change in step length that is an output result from the stabilizer, thus, enhancing the autonomous movement performance of the robotic apparatus 1 (e.g., automatically stop the robotic apparatus 1 due to a disturbance from the traveling direction).

(Example 2) A maximum value can be set by the user to the amount of change in step length that is an output result from the center of gravity horizontal stabilizer to determine a value exceeding the maximum value as danger, causing the robotic apparatus 1 to automatically stop and autonomously shift to a tumbling avoidance motion.

(Example 3) The aging degradation of the robot can be autonomously determined from an increase in average value of the amount of change in the landing point in a plane.

5. Hardware Configuration

Figure 15:
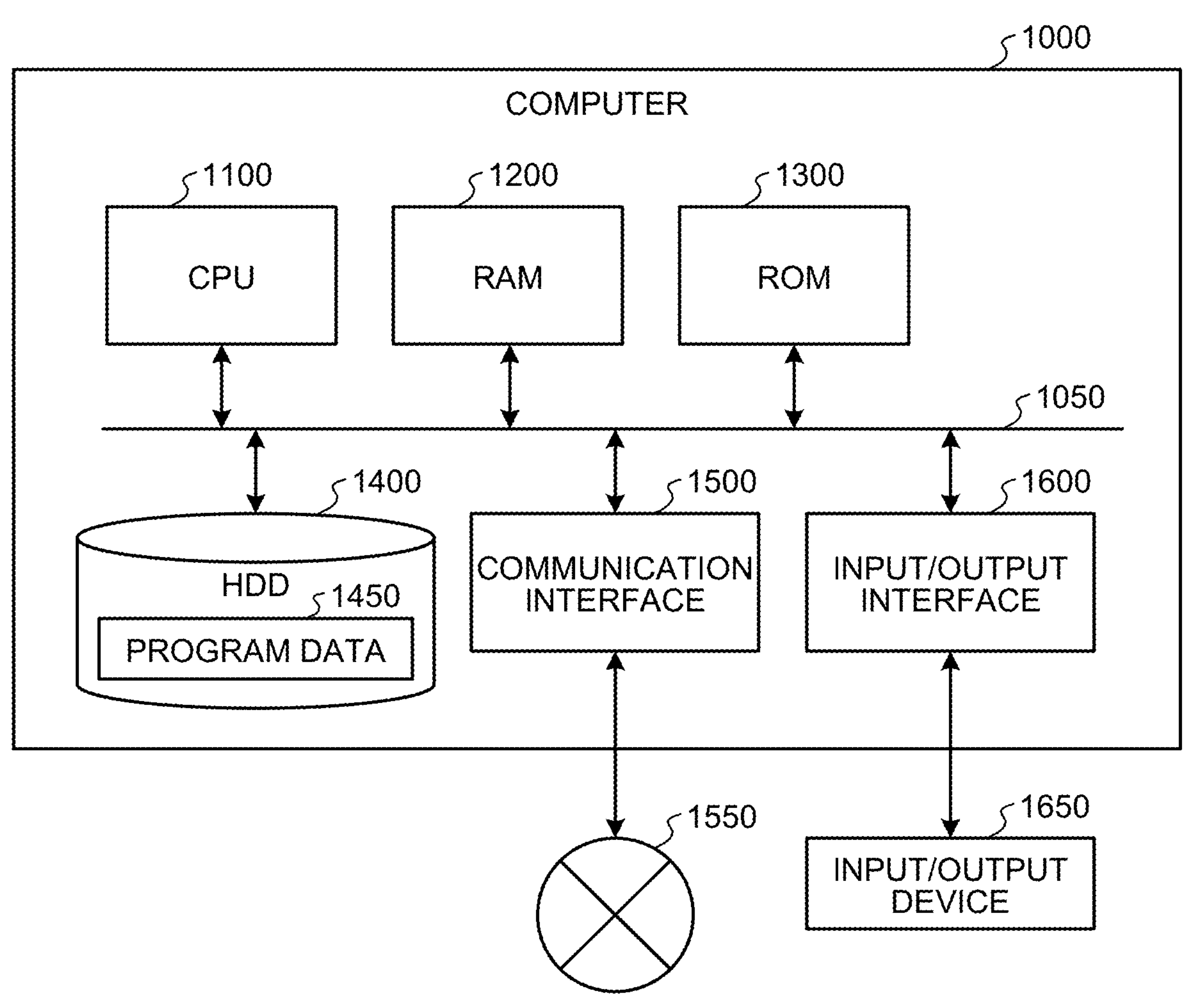
FIG. 15 is a hardware configuration diagram illustrating an example of a computer implementing the functions of the information processing device.

An information device such as the information processing device 100, according to the embodiment having been described above is implemented by, for example, a computer 1000 having a configuration as illustrated in FIG. 15. FIG. 15 is a hardware configuration diagram illustrating an example of the computer 1000 implementing the functions of the information processing device such as the information processing device 100. An example of the information processing device 100 according to the embodiment will be described below. The computer 1000 includes a CPU 1100, a RAM 1200, a read only memory (ROM) 1300, a hard disk drive (HDD) 1400, a communication interface 1500, and an input/output interface 1600. The respective units of the computer 1000 are connected by a bus 1050.

The CPU 1100 is operated on the basis of programs stored in the ROM 1300 or the HDD 1400 and controls the respective units. For example, the CPU 1100 deploys a program stored in the ROM 1300 or the HDD 1400 to the RAM 1200, and performs processing corresponding to each of various programs.

The ROM 1300 stores a boot program, such as a basic input output system (BIOS), executed by the CPU 1100 when the computer 1000 is booted, a program depending on hardware of the computer 1000, and the like.

The HDD 1400 is a computer-readable recording medium that non-transitorily records the programs performed by the CPU 1100, data used by the programs, and the like. Specifically, the HDD 1400 is a recording medium that records the programs according to the present disclosure as an example of program data 1450.

The communication interface 1500 is an interface for connecting the computer 1000 to an external network 1550 (e.g., the Internet). For example, the CPU 1100 receives data from another device or transmits data generated by the CPU 1100 to another device, via the communication interface 1500.

The input/output interface 1600 is an interface for connecting an input/output device 1650 and the computer 1000. For example, the CPU 1100 receives data from an input device such as a keyboard or mouse via the input/output interface 1600. In addition, the CPU 1100 transmits data to an output device such as a display, speaker, or printer via the input/output interface 1600. Furthermore, the input/output interface 1600 may function as a media interface that reads a program or the like recorded on a predetermined recording medium. The medium includes, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, when the computer 1000 functions as the information processing device 100 according to the embodiment, the CPU 1100 of the computer 1000 executes the programs loaded on the RAM 1200 to implement the functions of the control unit 110 and the like. Furthermore, the HDD 1400 stores the programs according to the present disclosure and various data. Note that the CPU 1100 executes the program data 1450 read from the HDD 1400, but in another example, the CPU 1100 may acquire these programs from another device via the external network 1550.

Furthermore, the effects descried herein are merely illustrative or exemplified effects, and are not limitative. In other words, with or in place of the above effects, the technology according to the present disclosure can provide other effects that are apparent to those skilled in the art from the description herein.

Note that the present technology can also have the following configurations.

(1)

An information processing device including:

a calculation unit that calculates an amount of change in a landing point of a landing point position to which a current swing leg of a robotic apparatus including one or more legs to land next from a planned landing point position, and an amount of change in the center of pressure of a position of the center of pressure to be generated by a current ground contact leg of the robotic apparatus from a position of a target center of pressure; and a drive control unit that controls an attitude and movement of the robotic apparatus, based on at least one of the amount of change in the landing point or the amount of change in the center of pressure, calculated by the calculation unit.

(2)

The information processing device according to (1), wherein the calculation unit calculates the amount of change in the landing point and the amount of change in the center of pressure, based on a horizontal position and a horizontal velocity of a current center of gravity of the robotic apparatus, a planned support point position obtained by averaging planned ground contact point positions of the ground contact legs of the robotic apparatus for N steps ahead (N is a natural number), and vertical positions of the center of gravity of the robotic apparatus for N steps ahead.

(3)

The information processing device according to (1), wherein the calculation unit considers a control model for the robotic apparatus as a center of gravity-center of pressure model including the center of gravity of the robotic apparatus and the center of pressure to be generated by the ground contact leg of the robotic apparatus, and calculates an equation of motion of the center of gravity of the robotic apparatus for N steps ahead with the amount of change in the landing point and the amount of change in the center of pressure as unknown parameters.

(4)

The information processing device according to (1), wherein the calculation unit calculates an equation of motion of the center of gravity of the robotic apparatus including a flight phase.

(5)

The information processing device according to (2), wherein the calculation unit solves an equation of motion of the center of gravity of the robotic apparatus N steps ahead, under a constraint condition that the center of gravity of the robotic apparatus at the Nth step stops immediately above the planned support point position of the robotic apparatus at the Nth step when infinite time has passed after the robotic apparatus reaches the Nth step, and calculates the amount of change in the landing point and the amount of change in the center of pressure.

(6)

The information processing device according to (1), wherein the calculation unit solves an equation of motion of the center of gravity of the robotic apparatus N steps ahead, under a constraint condition that an attitude and movement of the robotic apparatus N steps ahead matches an attitude and movement of the robotic apparatus (N−1) steps ahead, and calculates the amount of change in the landing point and the amount of change in the center of pressure.

(7)

The information processing device according to (1), wherein the calculation unit calculates a minimum value of the amount of change in the landing point and a minimum value of the amount of change in the center of pressure.

(8)

The information processing device according to (1), wherein the robotic apparatus is a legged robotic apparatus including four legs.

(9)

An information processing method including:

an arithmetic processing device, calculating an amount of change in a landing point of a landing point position to which a current swing leg of a robotic apparatus including one or more legs to land next from a planned landing point position, or an amount of change in the center of pressure of a position of the center of pressure to be generated by a current ground contact leg of the robotic apparatus from a position of a target center of pressure; and controlling an attitude and movement of the robotic apparatus, based on at least one of the amount of change in the landing point or the amount of change in the center of pressure, calculated.

(10)

A program for causing a computer to function as:

a calculation unit that calculates an amount of change in a landing point of a landing point position to which a current swing leg of a robotic apparatus including one or more legs to land next from a planned landing point position, or an amount of change in the center of pressure of a position of the center of pressure to be generated by a current ground contact leg of the robotic apparatus from a position of a target center of pressure; and a drive control unit that controls an attitude and movement of the robotic apparatus, based on at least one of the amount of change in the landing point or the amount of change in the center of pressure, calculated by the calculation unit.

| Reference Signs List | |
|---|---|
| 1 | ROBOTIC APPARATUS |
| 11 | INPUT UNIT |
| 12 | DRIVE UNIT |
| 13 | TORQUE DETECTION UNIT |
| 100 | INFORMATION PROCESSING DEVICE |
| 110 | CONTROL UNIT |
| 111 | GENERATION UNIT |
| 112 | ESTIMATION UNIT |
| 113 | CALCULATION UNIT |
| 114 | DRIVE CONTROL UNIT |

The invention claimed is:

1. An information processing device, comprising:

a central processing unit (CPU) configured to:

calculate an amount of change in a landing point of a current swing leg of a plurality of legs of a robotic apparatus from a planned landing point position, wherein the landing point is a landing point position to which the current swing leg, of the robotic apparatus, is to land next;

calculate an amount of change in a center of pressure of a first position of a center of pressure to be generated, by a current ground contact leg of the plurality of legs of the robotic apparatus, from a second position of a target center of pressure;

calculate, based on the amount of change in the landing point, torque to be generated in each joint of the robotic apparatus, to land the current swing leg of the robotic apparatus at the landing point position;

control an attitude and movement of the robotic apparatus, based on at least one of the calculated amount of change in the landing point, the calculated amount of change in the center of pressure, or the calculated torque to be generated in each joint of the robotic apparatus; and calculate, based on the amount of change in the landing point and the amount of change in the center of pressure, an equation of motion of a first center of gravity of the robotic apparatus including a flight phase, wherein the flight phase corresponds to a phase in which none of the plurality of legs of the robotic apparatus is in contact with ground.

2. The information processing device according to claim 1, wherein the CPU is further configured to calculate the amount of change in the landing point and the amount of change in the center of pressure, based on a horizontal position and a horizontal velocity of a second center of gravity of the robotic apparatus, a planned support point position obtained by an average of planned ground contact point positions of ground contact legs of the plurality of legs of the robotic apparatus for N steps ahead (N is a natural number), and vertical positions of a specific center of gravity of the robotic apparatus for the N steps ahead.

3. The information processing device according to claim 1, wherein the CPU is further configured to calculate, based on a control model for the robotic apparatus, an equation of motion of a specific center of gravity of the robotic apparatus for N steps ahead with the amount of change in the landing point and the amount of change in the center of pressure as unknown parameters, and the control model for the robotic apparatus is a center of gravity-center of pressure model including the specific center of gravity of the robotic apparatus and the center of pressure to be generated by the current ground contact leg of the robotic apparatus.

4. The information processing device according to claim 2, wherein the CPU is further configured to:

solve an equation of motion of the specific center of gravity of the robotic apparatus for the N steps ahead, under a constraint condition that the specific center of gravity of the robotic apparatus at an Nth step stops immediately above the planned support point position of the robotic apparatus at the Nth step when infinite time has passed after the robotic apparatus reaches the Nth step; and calculate, based on the solution of the equation of motion, the amount of change in the landing point and the amount of change in the center of pressure.

5. The information processing device according to claim 1, wherein the CPU is further configured to:

solve an equation of motion of a specific center of gravity of the robotic apparatus for N steps ahead (N is a natural number), under a constraint condition that an attitude and movement of the robotic apparatus for the N steps ahead matches an attitude and movement of the robotic apparatus for (N−1) steps ahead; and calculate, based on the solution of the equation of motion, the amount of change in the landing point and the amount of change in the center of pressure.

6. The information processing device according to claim 1, wherein the CPU is further configured to calculate a minimum value of the amount of change in the landing point and a minimum value of the amount of change in the center of pressure.

7. The information processing device according to claim 1, wherein the robotic apparatus is a legged robotic apparatus, and a number of the plurality of legs is four.

8. An information processing method, comprising:

calculating an amount of change in a landing point of a current swing leg of a plurality of legs of a robotic apparatus from a planned landing point position, wherein the landing point is a landing point position to which the current swing leg, of the robotic apparatus, is to land next;

calculating an amount of change in a center of pressure of a first position of a center of pressure to be generated, by a current ground contact leg of the plurality of legs of the robotic apparatus, from a second position of a target center of pressure;

calculating, based on the amount of change in the landing point, torque to be generated in each joint of the robotic apparatus, to land the current swing leg of the robotic apparatus at the landing point position;

controlling an attitude and movement of the robotic apparatus, based on at least one of the calculated amount of change in the landing point, the calculated amount of change in the center of pressure, or the calculated torque to be generated in each joint of the robotic apparatus; and calculating, based on the amount of change in the landing point and the amount of change in the center of pressure, an equation of motion of a center of gravity of the robotic apparatus including a flight phase, wherein the flight phase corresponds to a phase in which none of the plurality of legs of the robotic apparatus is in contact with ground.

9. A non-transitory computer-readable medium having stored thereon, computer-executable instructions which, when executed by a computer, cause the compute to execute operations, the operations comprising:

calculating an amount of change in a landing point of a current swing leg of a plurality of legs of a robotic apparatus from a planned landing point position, wherein the landing point is a landing point position to which the current swing leg, of the robotic apparatus, is to land next;

calculating an amount of change in a center of pressure of a first position of a center of pressure to be generated, by a current ground contact leg of the plurality of legs of the robotic apparatus, from a second position of a target center of pressure;

calculating, based on the amount of change in the landing point, torque to be generated in each joint of the robotic apparatus, to land the current swing leg of the robotic apparatus at the landing point position;

controlling an attitude and movement of the robotic apparatus, based on at least one of the calculated amount of change in the landing point, the calculated amount of change in the center of pressure, or the calculated torque to be generated in each joint of the robotic apparatus; and calculating, based on the amount of change in the landing point and the amount of change in the center of pressure, an equation of motion of a center of gravity of the robotic apparatus including a flight phase, wherein the flight phase corresponds to a phase in which none of the plurality of legs of the robotic apparatus is in contact with ground.

* * * * *